(12) United States Patent
Lim et al.

(10) Patent No.: US 11,949,779 B2
(45) Date of Patent: Apr. 2, 2024

(54) METHOD AND APPARATUS FOR REGISTERING SHARED KEY

(71) Applicant: Samsung Electronics Co., Ltd., Suwon-si (KR)

(72) Inventors: Taehyung Lim, Suwon-si (KR); Inyoung Shin, Suwon-si (KR); Jonghyo Lee, Suwon-si (KR); Sooyeon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 17/423,259

(22) PCT Filed: Oct. 31, 2019

(86) PCT No.: PCT/KR2019/014527
§ 371 (c)(1),
(2) Date: Jul. 15, 2021

(87) PCT Pub. No.: WO2020/149500
PCT Pub. Date: Jul. 23, 2020

(65) Prior Publication Data
US 2022/0131685 A1     Apr. 28, 2022

(30) Foreign Application Priority Data
Jan. 17, 2019   (KR) .................. 10-2019-0006453

(51) Int. Cl.
*H04L 9/08*      (2006.01)
*H04L 9/32*      (2006.01)

(52) U.S. Cl.
CPC ............ *H04L 9/085* (2013.01); *H04L 9/3268* (2013.01)

(58) Field of Classification Search
CPC ............................ H04L 9/085; H04L 9/3268
(Continued)

(56) References Cited

U.S. PATENT DOCUMENTS 9,365,188 B1 *   6/2016   Penilla ................. G06Q 30/00
9,688,247 B1 *   6/2017   Jayaraman ............... H04L 9/32
(Continued)

FOREIGN PATENT DOCUMENTS

KR   10-2015-0084110 A   7/2015
KR   10-2018-0058996 A   6/2018
(Continued)

OTHER PUBLICATIONS

Wei et al., HIBS-KSharing: Hierarchical Identity-Based Signature Key Sharing for Automotive, Aug. 21, 2017, IEEE, vol. 5, pp. 16314-16322 (Year: 2017).*
(Continued)

*Primary Examiner* — Thanh T Le
(74) *Attorney, Agent, or Firm* — Jefferson IP Law, LLP

(57) ABSTRACT

Provided is a method and apparatus for registering a shared key. A method of registering, by a second electronic device, a shared digital key in a target device includes receiving a digital key sharing attestation and a key tracking server (KTS) signature corresponding to the digital key sharing attestation, receiving an authentication request from the target device, and transmitting an authentication response including the digital key sharing attestation and the KTS signature to the target device in response to the authentication request.

4 Claims, 18 Drawing Sheets

(58) Field of Classification Search
USPC .......................................................... 380/277
See application file for complete search history.

(56) References Cited

U.S. PATENT DOCUMENTS

| | | | | |
|---|---|---|---|---|
| 2014/0277837 | A1* | 9/2014 | Hatton | ................ H04L 63/0853 |
| | | | | 701/2 |
| 2015/0039890 | A1* | 2/2015 | Khosravi | .............. H04L 9/0861 |
| | | | | 713/171 |
| 2016/0019738 | A1* | 1/2016 | Kim | .................... G07C 9/00182 |
| | | | | 340/5.22 |
| 2017/0104589 | A1* | 4/2017 | Lambert | ............... H04L 9/3268 |
| 2018/0213405 | A1 | 7/2018 | Jung et al. | |
| 2018/0241574 | A1 | 8/2018 | Kakutani et al. | |
| 2019/0001926 | A1* | 1/2019 | Arakawa | ............... B60R 25/241 |
| 2019/0349360 | A1* | 11/2019 | Yeddula | .............. H04L 63/0807 |
| 2020/0052905 | A1* | 2/2020 | Mathias | ................. H04L 9/006 |
| 2021/0250355 | A1* | 8/2021 | Galdo | .................... G06F 21/335 |
| 2021/0409200 | A1* | 12/2021 | Lim | ....................... H04L 9/0825 |

FOREIGN PATENT DOCUMENTS

| | | |
|---|---|---|
| KR | 10-2018-0086118 A | 7/2018 |
| KR | 10-2018-0095455 A | 8/2018 |
| WO | 2018/160863 A1 | 9/2018 |
| WO | WO-2018160863 A1 * | 9/2018 ......... H04L 63/0823 |

OTHER PUBLICATIONS

Inyoung Shin et al, "Digital Key sharing Specification", version 1.0. Car Connectivity Consortium, pp. 1-34, Nov. 26, 2018.
Inyoung Shin et al, "Car Connectivity Consortium Digital Key Task Group", Seoul DKTG meeting, pp. 1-36, Nov. 27, 2018.
International Search Report dated Feb. 13, 2020, issued in International Patent Application No. PCT/KR2019/014527.

* cited by examiner

METHOD AND APPARATUS FOR REGISTERING SHARED KEY

TECHNICAL FIELD

The present disclosure relates to a method and apparatus for registering a shared key, and more particularly, to a method and apparatus for registering a shared key by processing a key tracking server (KTS) signature and an immobilizer token.

BACKGROUND ART

As personalized electronic devices, such as smart phones and tablet PCs, have become popularized, technology for performing security and authentication using digitized virtual keys, that is, digital keys, has been developed. As a method for such digital key technology, a technology for integrating a digital key into an electronic device, for example, a smart phone, by using wireless communication technology has been developed.

Because a digital key is inserted into an electronic device, a user of the electronic device may open and close a door by using the digital key in replacement of a physical key. Also, because functions of digital keys are further extended, users of electronic devices may use the digital keys for access to and control of devices.

While the use of digital keys may bring great improvement in user convenience and industrial effect, concern about security has also been raised. Due to the feature of a digital key requiring combination with an electronic device, the digital key may be exposed to a risk such as hacking into the electronic device. Thus, it is necessary to process digital keys in high-security areas.

DESCRIPTION OF EMBODIMENTS

Technical Problem

The present disclosure provides a method and apparatus for registering a shared key.

Solution to Problem

According to an embodiment, a method of registering, by a second electronic device, a shared digital key in a target device includes receiving a digital key sharing attestation and a key tracking server (KTS) signature corresponding to the digital key sharing attestation, receiving an authentication request from the target device, and transmitting an authentication response including the digital key sharing attestation and the KTS signature to the target device in response to the authentication request.

According to an embodiment, a method of obtaining, by a KTS signature obtaining server, a KTS signature includes receiving a digital key sharing attestation from a first device, verifying the digital key sharing attestation, obtaining a KTS signature corresponding to the digital key sharing attestation, and transmitting the KTS signature to a second device.

According to an embodiment, a method of obtaining, by an immobilizer token obtaining server, an immobilizer token includes receiving a digital key sharing attestation from a first device, verifying the digital key sharing attestation, obtaining an immobilizer token corresponding to the digital key sharing attestation, and transmitting the immobilizer token to a second device.

According to an embodiment, a second electronic device for registering a shared digital key in a target device includes a communicator, at least one memory storing a program for registering the shared digital key in the target device, and at least one processor configured to execute the program to receive a digital key sharing attestation and a KTS signature corresponding to the digital key sharing attestation, receive an authentication request from the target device, and transmit an authentication response including the digital key sharing attestation and the KTS signature to the target device in response to the authentication request.

According to an embodiment, a KTS signature obtaining server includes a communicator, at least one memory storing a program for obtaining a KTS signature, and at least one processor configured to execute the program to receive a digital key sharing attestation from a first device, verify the digital key sharing attestation, obtain a KTS signature corresponding to the digital key sharing attestation, and transmit the KTS signature to a second device.

According to an embodiment, an immobilizer token obtaining server includes a communicator, at least one memory storing a program for obtaining an immobilizer token, and at least one processor configured to execute the program to receive a digital key sharing attestation from a first device, verify the digital key sharing attestation, obtain an immobilizer token corresponding to the digital key sharing attestation, and transmit the immobilizer token to a second device.

BEST MODE

Figure 1:
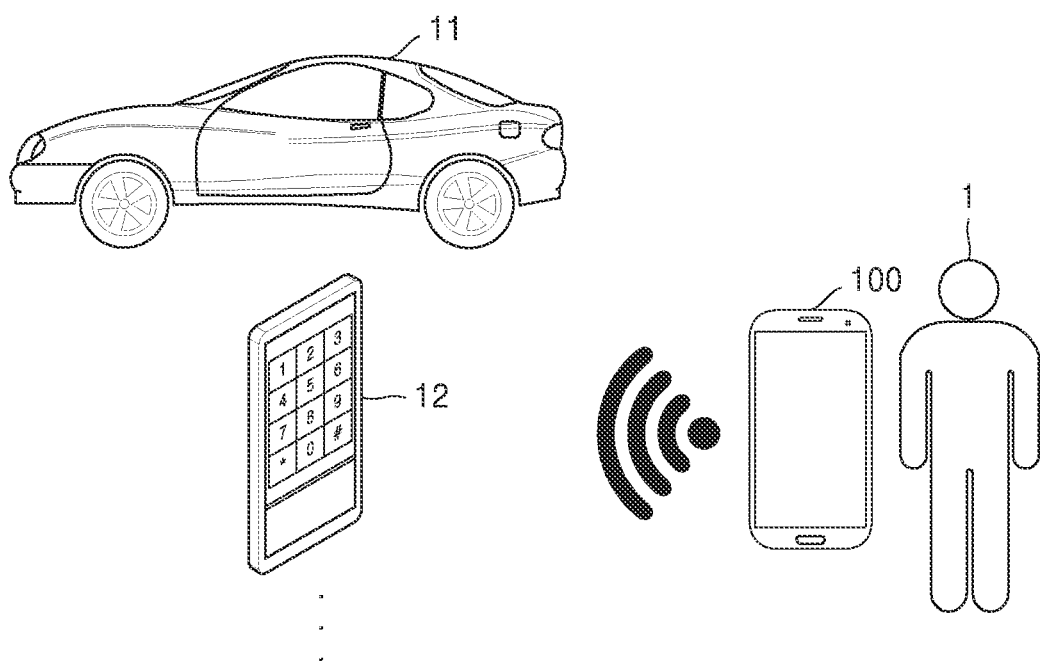
FIG. 1 is a diagram for describing an environment to which a digital key is applied.

According to an embodiment, a method of registering, by a second electronic device, a shared digital key in a target device includes receiving a digital key sharing attestation and a key tracking server (KTS) signature corresponding to the digital key sharing attestation, receiving an authentication request from the target device, and transmitting an authentication response including the digital key sharing attestation and the KTS signature to the target device in response to the authentication request.

Mode of Disclosure

Hereinafter, embodiments of the disclosure will be described in detail with reference to the accompanying drawings so that those of ordinary skill in the art may easily implement the embodiments of the disclosure. However, the disclosure may be embodied in many different forms and should not be construed as being limited to the embodiments set forth herein. Also, portions irrelevant to the description of the disclosure will be omitted in the drawings for a clear description of the disclosure, and like reference numerals will denote like elements throughout the specification.

Some embodiments of the disclosure may be represented by functional block configurations and various processing operations. Some or all of these functional blocks may be implemented by any number of hardware and/or software components that execute particular functions. For example, the functional blocks of the disclosure may be implemented by one or more microprocessors or may be implemented by circuit configurations for a certain function. Also, for example, the functional blocks of the disclosure may be implemented in various programming or scripting languages. The functional blocks may be implemented as an algorithm executed in one or more processors. Also, the disclosure may employ the related art for electronic environment setting, signal processing, and/or data processing.

Also, the connection lines or connection members between the components illustrated in the drawings are merely examples of functional connections and/or physical or logical connections. In an actual apparatus, the connections between components may be represented by various functional connections, physical connections, or logical connections that are replaceable or added.

Hereinafter, the disclosure will be described in detail with reference to the accompanying drawings.

FIG. 1 is a diagram for describing an environment to which a digital key is applied according to an embodiment.

Referring to FIG. 1, an owner device 100, a user 1 of the owner device 100, and electronic devices 11, 12, . . . for performing access and control by using a digital key stored in the owner device 100 are illustrated. In an embodiment, the user 1 using the owner device 100 may be referred to as an owner.

The owner device 100 may include a personalized mobile device, but is not limited thereto and may include various types of electronic devices. For example, the owner device 100 may include a smart phone, a tablet PC, a PC, a camera, a wearable device, and the like. The owner device 100 may perform processing such as creating, deleting, managing, and sharing a digital key for accessing the electronic devices 11, 12, . . . and controlling the electronic devices 11, 12, . . . and may perform authentication on the digital key.

The electronic devices 11, 12, . . . may interact with the owner device 100 to perform an operation for creating a digital key and may be controlled and accessed by using the digital key.

As an example, the owner device 100 may store a digital key for interacting with an electronic device 11 mounted on a vehicle. The owner device 100 may control various operations of the vehicle by using the stored digital key. For example, the owner device 100 may use the digital key to open/close the door of the vehicle, start the engine thereof, and control various devices mounted on the vehicle. In addition, it may also be used to control an operation related to autonomous driving, such as an automatic parking system.

As another example, the owner device 100 may store a digital key for interacting with a doorlock 12. The owner device 100 may open/close a door by using the stored digital key.

The electronic devices that may be controlled by the owner device 100 by using the digital key are not limited to the examples illustrated in FIG. 1, and the digital key technology may be applied to various electronic devices. Hereinafter, for convenience of description, a case where the owner device 100 interacts with the electronic device 11 mounted on the vehicle will be described as an example. However, the following description may also be applied to a case where the owner device 100 interacts with various electronic devices other than the electronic device 11 of the vehicle.

Figure 2:
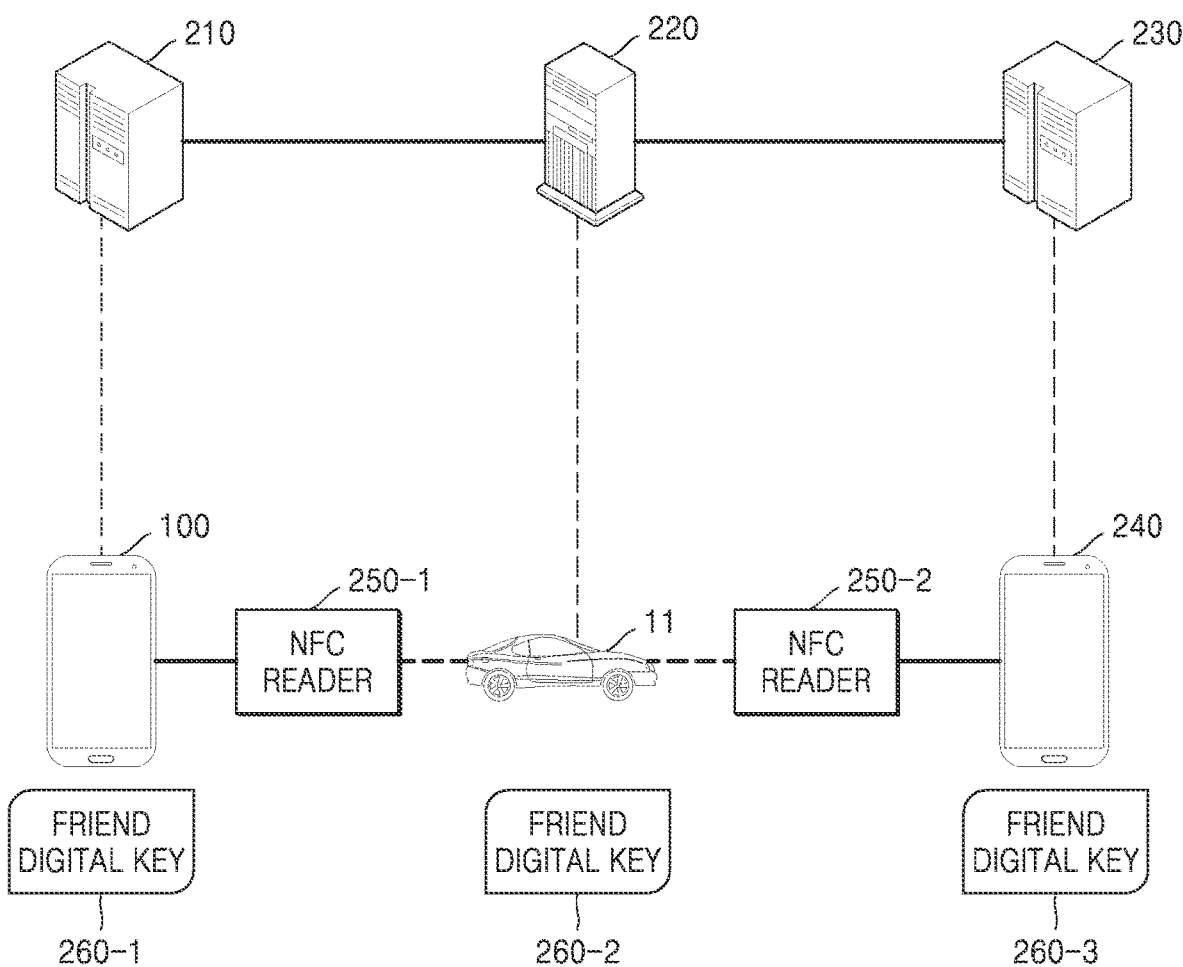
FIG. 2 is a diagram for describing a system for implementing a service using a digital key, according to an embodiment.

FIG. 2 is a diagram for describing a system for implementing a service using a digital key, according to various embodiments of the disclosure.

Referring to FIG. 2, an owner device backend server 210, a target device backend server 220, a backend server 230 for an electronic device of another user, an owner device 100, and a first near field communication (NFC) reader 250-1, an electronic device 11, a second NFC reader 250-2, an electronic device 240 of another user, and digital keys 260-1, 260-2, and 260-3 of other users are illustrated. In various embodiments of the disclosure, the electronic device 11 may be referred to as a target device. Also, the electronic device 240 of another user may be an electronic device other than the owner device 100 owned by an owner 1.

The owner device backend server 210 may provide a technology and service for securely issuing and storing a digital key to the owner device 100. The owner device backend server 210 may be, for example, a server operated by an original equipment manufacturer (OEM) of the owner device 100, may be a server operated by a communication company providing a mobile communication service, or may be a server operated by a service provider providing a digital key service.

For example, when a user 1 purchases a vehicle and intends to store a digital key of the vehicle on the owner device 100, the owner device 100 may perform an authentication procedure. For example, the owner device 100 may perform an authentication procedure for determining whether the user 1 is a valid user, whether the vehicle is a valid vehicle, or the like, and the owner device backend server 210 may support the authentication procedure.

The target device backend server 220 may provide a digital key service related to the target device. For example, the target device backend server 220 may provide a digital key service for an access function such as door opening/closing, engine starting, control, or the like. In an embodiment, the target device backend server 220 may be a server operated by a service provider that intends to provide a digital key service to a user. More particularly, the target device backend server 220 may be a server operated by a manufacturer of the target device 11 or may be a backend server operated by a service provider linked with the manufacturer. Here, the service provider may refer to, for example, a business operator providing services related to vehicles, hotels, houses, buildings, or the like and may provide a digital key service to the user as an additional service according to the main service. For example, when vehicle companies sell vehicles and hotel, house, or building companies provide hotel, house, or building-related services, the target device backend server 220 may be operated by each of the vehicle companies or the hotel, house, or building companies.

In an embodiment, the target device backend server 220 may include a user information database such as user account information such as the user's ID or password and sales product or service information. For example, when a vehicle company sells a vehicle, it may store the user's ID or password, the sold vehicle's identification number, and information about whether to use a digital key service.

In an embodiment, the target device backend server 220 may transmit information for service of a digital key to the owner device backend server 210 in order to provide a digital key service to the user. Also, the target device backend server 220 may transmit information for service of a digital key to the backend server 230 for an electronic device of another user in order to provide a digital key service to another user (e.g., a friend).

The backend server 230 for an electronic device of another user may provide a technology and service for securely issuing and storing a digital key to an electronic device of another user. The backend server 230 for an electronic device of another user may be a server operated by a manufacturer of the electronic device 240 of another user (e.g., a friend) other than the owner. The manufacturer of the owner device 100 may be the same as or different from the manufacturer of the electronic device 240 of another user (e.g., a friend).

In the disclosure, although the term "backend server" is used for convenience of description, "backend server" may be replaced with "server". That is, operations performed in the backend server may be understood as operations performed in the server.

The electronic device 11 may be an entity corresponding to a product and service that the service provider sells to the user. For example, the electronic device 11 may include a gate of a vehicle, a hotel, a house, a building, or the like. More particularly, the electronic device 11 may include not only a vehicle door, a trunk gate, or a fuel intake in a vehicle but also an access gate for controlling the vehicle and starting the engine thereof, or the like. As described above, in various embodiments of the disclosure, the electronic device 11 may be referred to as the target device 11.

In various embodiments of the disclosure, the owner device 100, the target device 11, and the electronic device 240 of another user may share a digital key. In this case, the owner device 100 may be an electronic device connected to the owner device backend server 210 and may be a subject that is to issue a digital key and transmit the digital key to the electronic device 240 of another user. The electronic device 240 of another user may be an electronic device connected to the target device backend server 220 and may be an object that is to be issued with a digital key. For example, the user of the owner device 100 may share the digital key stored in the owner device 100 with the electronic device 240 of another user owned by the friend in order to lend the user's vehicle to the friend.

For example, the owner device 100 may issue and store a digital key 260-1 of another user, the target device 11 may store a digital key 260-2 of another user issued by the owner device 100, the target device 11, or another device, and the electronic device 240 of another user may store a digital key 260-3 issued by another device. Here, the digital key 260-1, the digital key 260-2, and the digital key 260-3 may be the same as or different from each other.

In an embodiment, the owner device 100 may transmit/receive a digital key and data related to the digital key to/from the target device 11 through the first NFC reader 250-1, and the electronic device 240 of another user may transmit/receive a digital key and data related to the digital key to/from the target device 11 through the second NFC reader 250-2.

Figure 3:
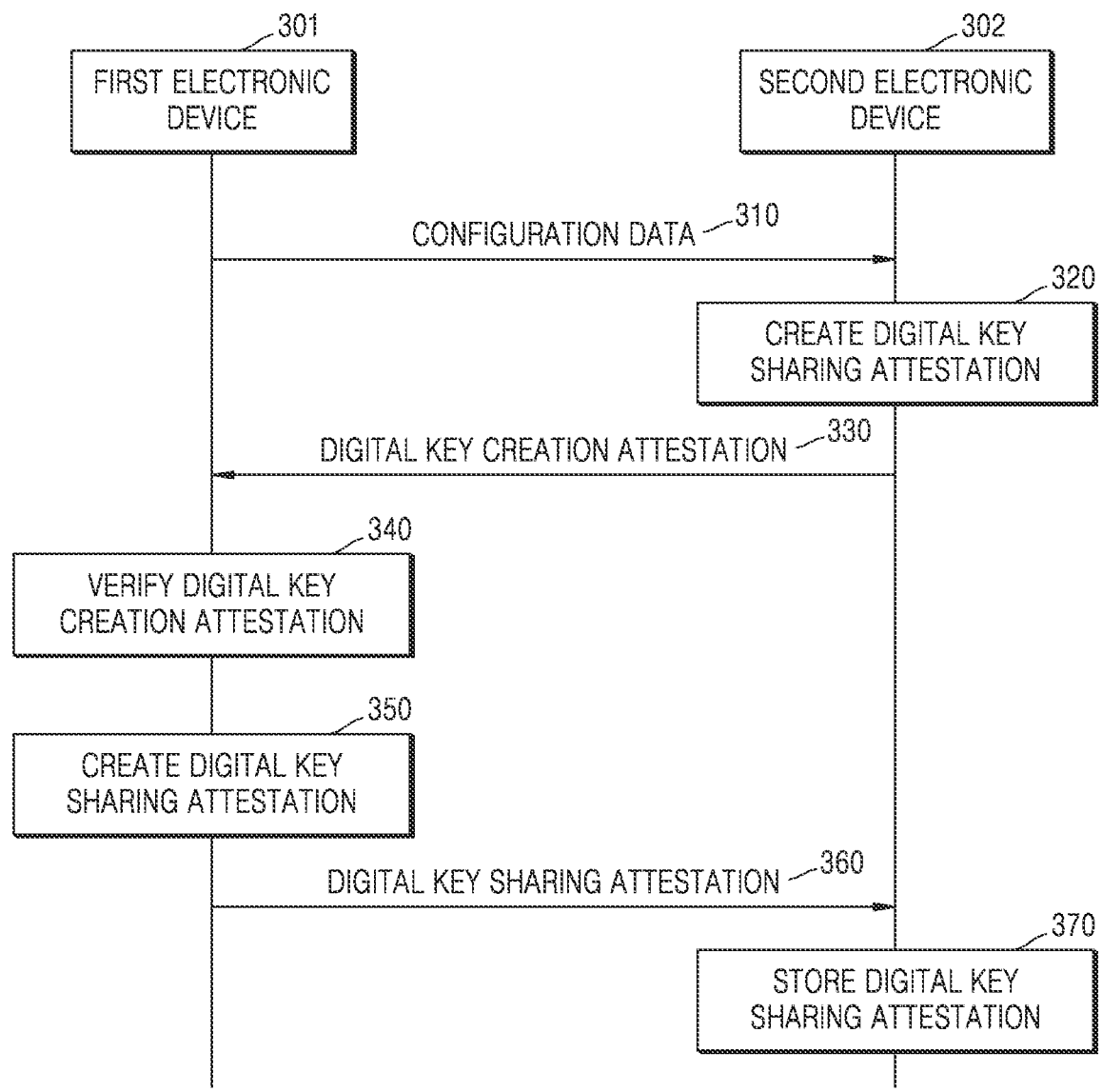
FIG. 3 is a flowchart of a method of transmitting, by an owner device, a digital key to an electronic device of another user, according to an embodiment.

FIG. 3 is a flowchart of a method of transmitting, by an owner device, a digital key to an electronic device of another user, according to an embodiment.

FIG. 3 illustrates an embodiment in which, when an owner device is adjacent to an electronic device of another user and thus is capable of short-range communication such as NFC communication, Bluetooth, or Ultra Wide Band (UWB), the owner device transmits a digital key by using the short-range communication.

In operation 310, a first electronic device 301, that is, an owner device, may transmit digital key configuration data to a second electronic device 302, that is, an electronic device of another user. The digital key configuration data may include information that should be provided by the first electronic device 301 to create a digital key. For example, the digital key configuration data may include the scope of control right assigned to the second electronic device 302, the validity period of the digital key, or the like.

In operation 320, the second electronic device 302 may create a digital key creation attestation. More particularly, the second electronic device 302 may create a digital key creation attestation based on the digital key configuration data received from the first electronic device 301. The digital key creation attestation created by the second electronic device 302 may include a series of data and a signature of the second electronic device 302 about the series of data. The series of data may include digital key configuration data received by the second electronic device 302 and additional information (extra data) created by the second electronic device 302. The additional information created by the second electronic device 302 may include, for example, a public key of the second electronic device 302.

In operation 330, the second electronic device 302 may transmit the digital key creation attestation to the first electronic device 301. Additionally, the second electronic device 302 may further transmit an associated attestation to the first electronic device 301. Here, the associated attestation may be requested to verify the validity of the digital key creation attestation.

In operation 340, the first electronic device 301 may verify the digital key creation attestation received from the second electronic device 302. The first electronic device 301 may verify a signature of the digital key creation attestation by using the received associated attestation. Also, the first electronic device 301 may verify the contents of the digital key creation attestation by using the digital key configuration information stored in the first electronic device 301.

In operation 350, the first electronic device 301 may create a digital key sharing attestation based on the digital key creation attestation. The first electronic device 301 may create a digital key sharing attestation by signing the digital key creation attestation. That is, the digital key sharing attestation may include a digital key creation attestation and a signature of the first electronic device 301.

In operation 360, the first electronic device 301 may transmit the digital key sharing attestation to the second electronic device 302. In operation 370, the second electronic device 302 may store the received digital key sharing attestation.

Figure 4:
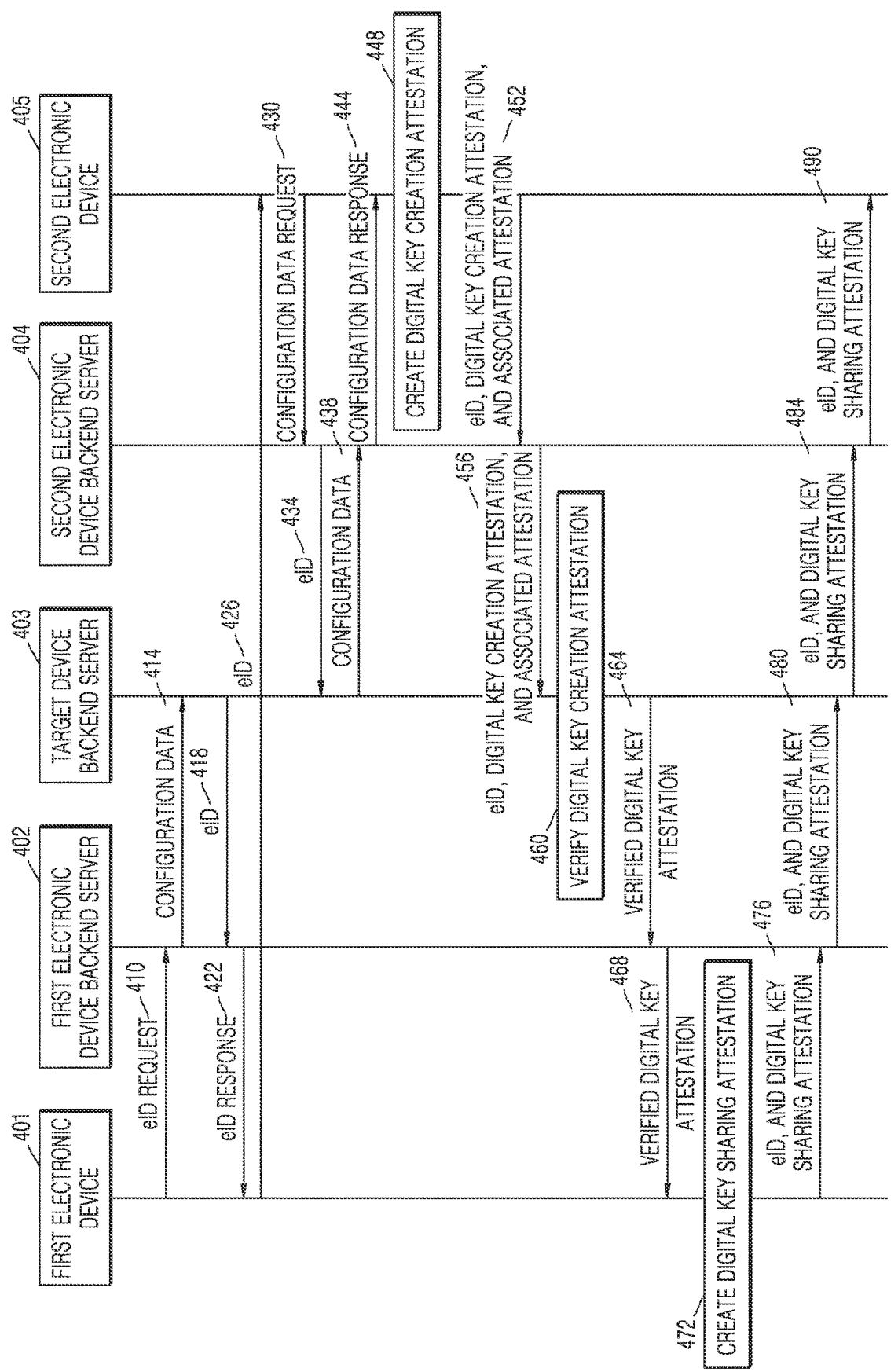
FIG. 4 is a flowchart of a method of transmitting, by an owner device, a digital key to an electronic device of another user, according to another embodiment.

FIG. 4 is a flowchart of a method of transmitting, by an owner device, a digital key to an electronic device of another user, according to another embodiment.

FIG. 4 illustrates an embodiment in which, when an owner device is distant from an electronic device of another user and thus is incapable of short-range communication such as NFC communication, the owner device transmits a digital key through another wired/wireless communication method. In FIG. 4, a first electronic device 401 and a second electronic device 405 may be the same devices as the first electronic device 301 and the second electronic device 302 of FIG. 3.

In operation 410, the first electronic device 401, that is, an owner device, may transmit an eID request including digital key configuration data to a first electronic device backend server 402, that is, an owner device backend server. The digital key configuration data may include information that should be provided by the first electronic device 401 to create a digital key. In this process, the first electronic device 401 may determine the user's intention of issuing the digital key, whether the user is a valid user of the first electronic device 401, or the like. Also, mutual authentication between the first electronic device backend server 402 and the first electronic device 401, that is, authentication between a device and a server, may be performed.

Thereafter, in operation 414, the first electronic device backend server 402 may transmit the digital key configuration data received from the first electronic device 401, to a target device backend server 403. In this process, server authentication between the first electronic device backend server 402 and the target device backend server 403 may be performed. Also, service eligibility authentication between the target device backend server 403 and the first electronic device 401 may be performed.

In operation 418, the target device backend server 403 may transmit an eID corresponding to the digital key configuration data to the first electronic device backend server 402. In an embodiment, the eID may function as a transaction ID in the entire digital key sharing process. The eID may include information about the target device backend server 403 (e.g., the name, address, or identifier of a service provider or a service provider server) and may further include a value corresponding to the information (e.g., a hash value of the information). The information about the target device backend server 403 included in the eID may be used by a first electronic device backend server, that is, an owner device backend server, a second electronic device backend server 404, that is, an electronic device backend server of another user, or the like to identify the target device backend server 403.

Thereafter, in operation 422, the first electronic device backend server 402 may transmit the eID to the first electronic device 401.

In operation 426, the first electronic device 401 may transmit the eID to the second electronic device 405.

Thereafter, in operation 430, the second electronic device 405 may request digital key configuration data by transmitting the eID to the second electronic device backend server 404. The second electronic device backend server 404 may identify the target device backend server 403 based on information about the service provider server included in the eID. In this process, the second electronic device 405 may determine the user's intention of issuing the digital key, whether the user is a valid user of the second electronic device 405, or the like. Also, mutual authentication between the second electronic device backend server 404 and the second electronic device 405, that is, authentication between a device and a server, may be performed.

In operation 434, the second electronic device backend server 404 may transmit the eID received from the second electronic device 405, to the target device backend server 403. In this process, server authentication between the second electronic device backend server 404 and the target device backend server 403 may be performed. Also, service eligibility authentication between the target device backend server 403 and the second electronic device 405 may be performed.

Thereafter, in operation 438, the target device backend server 403 may transmit the digital key configuration data corresponding to the eID to the second electronic device backend server 404.

In operation 444, the second electronic device backend server 404 may transmit the digital key configuration data to the second electronic device 405.

Thereafter, in operation 448, the second electronic device 405 may create a digital key creation attestation based on the received digital key configuration data. The digital key creation attestation created by the second electronic device 405 may include a series of data and a signature of the second electronic device 405 about the series of data. The series of data may include digital key configuration data received by the second electronic device 405 and additional information (extra data) created by the second electronic device 405. The additional information created by the second electronic device 405 may include, for example, a public key of the second electronic device 405.

In operation 452, the second electronic device 405 may transmit an eID, a digital key attestation, and an associated attestation to the second electronic device backend server 404. The associated attestation may be requested to authenticate the validity of the digital key attestation.

Thereafter, in operation 456, the second electronic device backend server 404 may transmit the eID, the digital key attestation, and the associated attestation to the target device backend server 403.

In operation 460, the target device backend server 403 may verify the digital key attestation and create a verified digital key attestation (Digital Key Verified Attestation). In this case, the target device backend server 403 may verify a signature of the digital key attestation by using the associated attestation. Also, the target device backend server 403 may verify the contents of the digital key attestation by using the digital key configuration information stored in the target device backend server 403. The target device backend server 403 may create a verified digital key attestation by signing the digital key attestation. Thus, the verified digital key attestation may include the digital key attestation and the signature of the target device backend server 403.

Thereafter, in operation 464, the target device backend server 403 may transmit the verified digital key attestation to the first electronic device backend server 402.

In operation 468, the first electronic device backend server 402 may transmit the verified digital key attestation to the first electronic device 401.

Thereafter, in operation 472, the first electronic device 401 may create a digital key sharing attestation based on the verified digital key attestation. The first electronic device 301 may create a digital key sharing attestation by signing the verified digital key attestation. In an embodiment, the first electronic device 401 may once again verify the digital key attestation verified by the target device backend server 403 in order to create a digital key sharing attestation. The digital key sharing attestation may include the digital key attestation verified by the target device backend server 403 and the signature of the first electronic device 401.

In operation 476, the first electronic device 401 may transmit the eID and the digital key sharing attestation to the first electronic device backend server 402. Thereafter, in operation 480, the first electronic device backend server 402 may transmit the eID and the digital key sharing attestation to the target device backend server 403, and in operation 484, the target device backend server 403 may transmit the eID and the digital key sharing attestation to the second electronic device backend server 404. Thereafter, in operation 490, the second electronic device backend server 404 may transmit the eID and the digital key sharing attestation to the second electronic device 405.

In operation 494, the second electronic device 405 may store the received digital key sharing attestation. The second electronic device 405 may control the target device 11 by using the stored digital key sharing attestation.

In FIGS. 3 and 4, a method of transmitting, by the owner device, the digital key to the electronic device of another user in a case where the electronic device of another user is adjacent to or is not adjacent to the owner device has been described. The above digital key transmitting method is merely an embodiment and is not limited thereto, and according to various embodiments, the owner device may transmit the digital key to the electronic device of another user. For example, operation 460 of FIG. 4, that is, a digital key creation attestation verifying operation, may be performed in the first electronic device 401 instead of the target device backend server 403.

Hereinafter, operations of a second electronic device, a key tracking server (KTS) signature obtaining server, and an immobilizer token obtaining server will be described.

Figure 5:
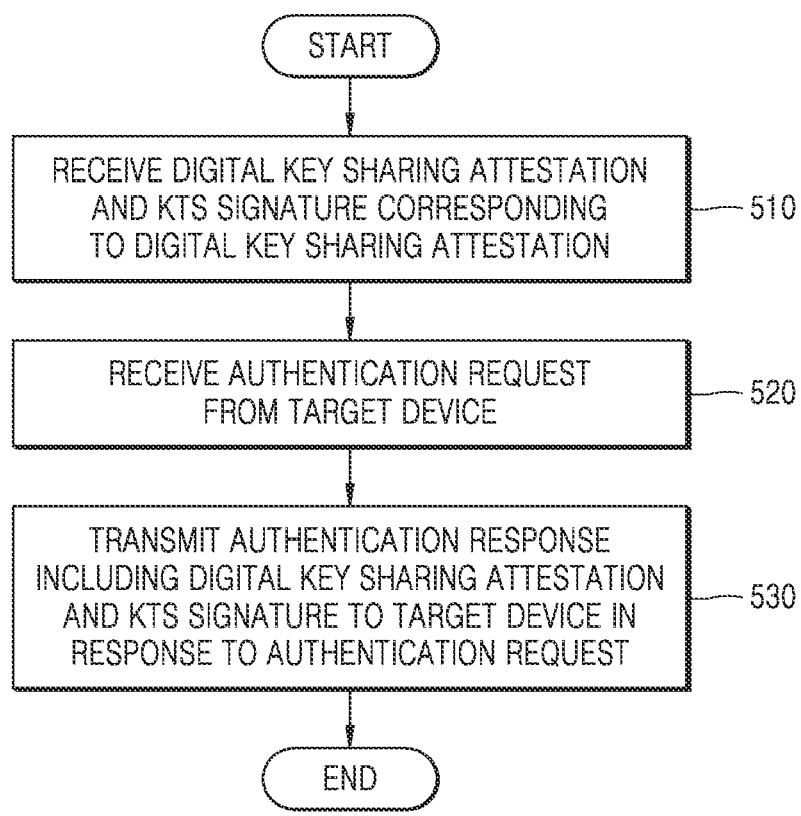
FIG. 5 is a flowchart illustrating a method of operating a second electronic device, according to an embodiment.

FIG. 5 is a flowchart illustrating a method of operating a second electronic device, according to an embodiment.

In operation 510, a second electronic device 240 may receive a digital key sharing attestation and a KTS signature corresponding to the digital key sharing attestation. In an embodiment, the second electronic device 240 may receive the KTS signature together with the digital key sharing attestation from a first electronic device 100. Also, the second electronic device 240 may receive the digital key sharing attestation from the first electronic device 100, transmit the received digital key sharing attestation to the KTS signature obtaining server, and receive the KTS signature from the KTS signature obtaining server. Here, the KTS signature obtaining server may be one of a KTS backend server, the target device backend server 220, and the second electronic device backend server 230. Also, in an embodiment, the second electronic device 240 may receive the digital key sharing attestation and the KTS signature from the second electronic device backend server 230.

In operation 520, the second electronic device 240 may receive an authentication request from the target device 11. Thereafter, in operation 530, the second electronic device 240 may transmit an authentication response including the digital key sharing attestation and the KTS signature to the target device 11 in response to the authentication request.

Although not illustrated in FIG. 5, according to an embodiment, the second electronic device 240 may receive an immobilizer token corresponding to the digital key sharing attestation and transmit the received immobilizer token to the target device 11. In an embodiment, the second electronic device 240 may receive the immobilizer token from the first electronic device 100. Also, the second electronic device 240 may transmit the received digital key sharing attestation to the immobilizer token obtaining server and receive the immobilizer token from the immobilizer token obtaining server. Here, the immobilizer token obtaining server may be one of an immobilizer token issuing server, the target device backend server 220, and the second electronic device backend server 230. Also, in an embodiment, the second electronic device 240 may receive the immobilizer token from the second electronic device backend server 230.

The immobilizer token receiving process described above may be performed together with or separately from a digital key sharing attestation receiving process and/or a KTS signature receiving process. For example, when an immobilizer token is required, an immobilizer token receiving process may be performed separately. More particularly, in a case where the target device 11 is a vehicle, when an immobilizer token is required to start the engine, the second electronic device 240 may perform an immobilizer token receiving process.

Figure 6:
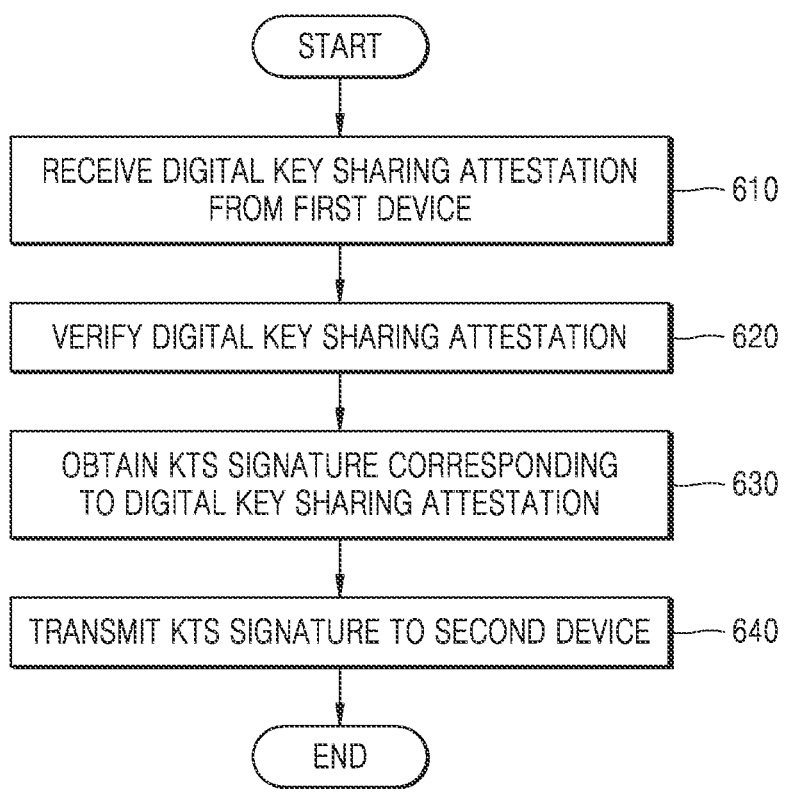
FIG. 6 is a flowchart illustrating a method of operating a key tracking server (KTS) signature obtaining server, according to an embodiment.

FIG. 6 is a flowchart illustrating a method of operating a KTS signature obtaining server, according to an embodiment.

In operation 610, the KTS signature obtaining server may receive a digital key sharing attestation from a first device. Here, the first device may be one of a first electronic device, a second electronic device, a first electronic device backend server, a second electronic device backend server, and a target device backend server. In an embodiment, the KTS signature obtaining server may receive information for verifying the digital key sharing attestation, together with or before receiving the digital key sharing attestation.

Thereafter, in operation 620, the KTS signature obtaining server may verify the digital key sharing attestation.

In operation 630, the KTS signature obtaining server may obtain a KTS signature corresponding to the digital key sharing attestation. In an embodiment, the KTS signature obtaining server may transmit the verified digital key sharing attestation to a separate backend server creating the KTS signature and may receive the KTS signature from the separate backend server creating the KTS signature. Also, in an embodiment, when the KTS signature obtaining server is a server creating a KTS signature, it may create a KTS signature corresponding to the digital key sharing attestation.

In operation 640, the KTS signature obtaining server may transmit the KTS signature to a second device. In an embodiment, the first device and the second device may be the same device. In this case, the second device may be one of the first electronic device, the second electronic device, the first electronic device backend server, the second electronic device backend server, and the target device backend server according to the first device. Also, in an embodiment, the first device and the second device may not be the same device. In this case, the KTS signature obtaining server may include the target device backend server, the first device may include the first electronic device backend server, and the second device may include the second electronic device backend server.

Figure 7:
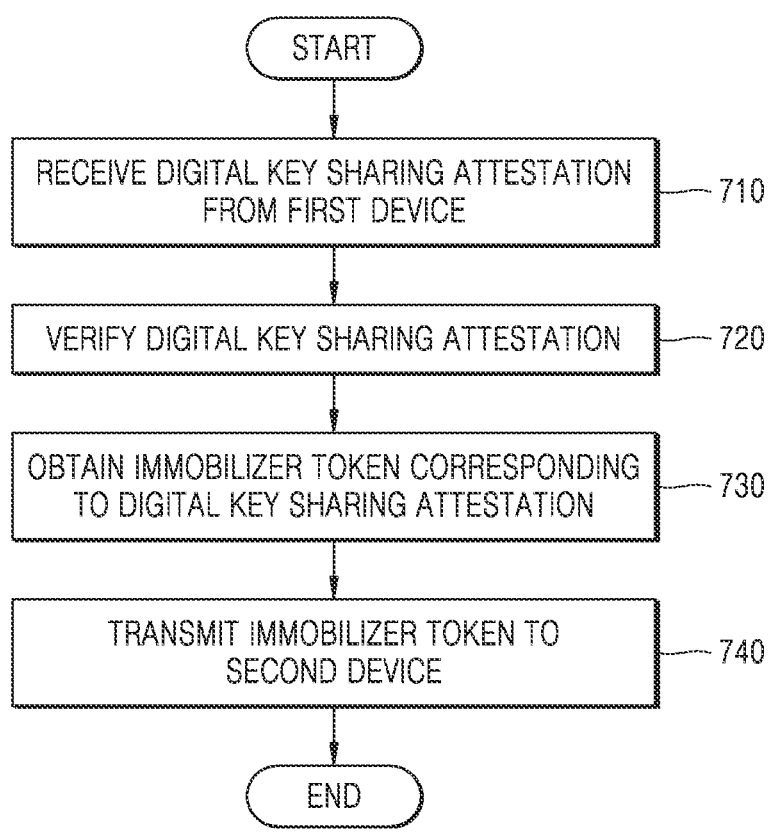
FIG. 7 is a flowchart illustrating a method of operating an immobilizer token obtaining server, according to an embodiment.

FIG. 7 is a flowchart illustrating a method of operating an immobilizer token obtaining server, according to an embodiment.

In operation 710, the immobilizer token obtaining server may receive a digital key sharing attestation from a first device. Here, the first device may be one of a first electronic device, a second electronic device, a first electronic device backend server, a second electronic device backend server, and a target device backend server. In an embodiment, the immobilizer token obtaining server may receive information for verifying the digital key sharing attestation, together with or before receiving the digital key sharing attestation.

Thereafter, in operation 720, the immobilizer token obtaining server may verify the digital key sharing attestation.

In operation 730, the immobilizer token obtaining server may obtain an immobilizer token corresponding to the digital key sharing attestation. In an embodiment, the immobilizer token obtaining server may transmit the verified digital key sharing attestation to a separate backend server creating the immobilizer token and may receive the immobilizer token from the separate backend server creating the immobilizer token. Also, in an embodiment, when the immobilizer token obtaining server is a server creating an immobilizer token, it may create an immobilizer token corresponding to the digital key sharing attestation.

In operation 740, the immobilizer token obtaining server may transmit the immobilizer token to a second device. In an embodiment, the first device and the second device may be the same device. In this case, the second device may be one of the first electronic device, the second electronic device, the first electronic device backend server, the second electronic device backend server, and the target device backend server according to the first device. Also, in an embodiment, the first device and the second device may not be the same device. In this case, the immobilizer token obtaining server may include the target device backend server, the first device may include the first electronic device backend server, and the second device may include the second electronic device backend server.

The immobilizer token receiving process described above may be performed together with or separately from a digital key sharing attestation receiving process and/or a KTS signature receiving process. For example, when an immobilizer token is required, an immobilizer token receiving process may be performed separately. More particularly, in a case where the target device 11 is a vehicle, when an immobilizer token is required to start the engine, the second electronic device 240 may perform an immobilizer token receiving process.

Hereinafter, a process in which the second electronic device receives a KTS signature and registers a digital key by using the KTS signature will be described.

Figure 8:
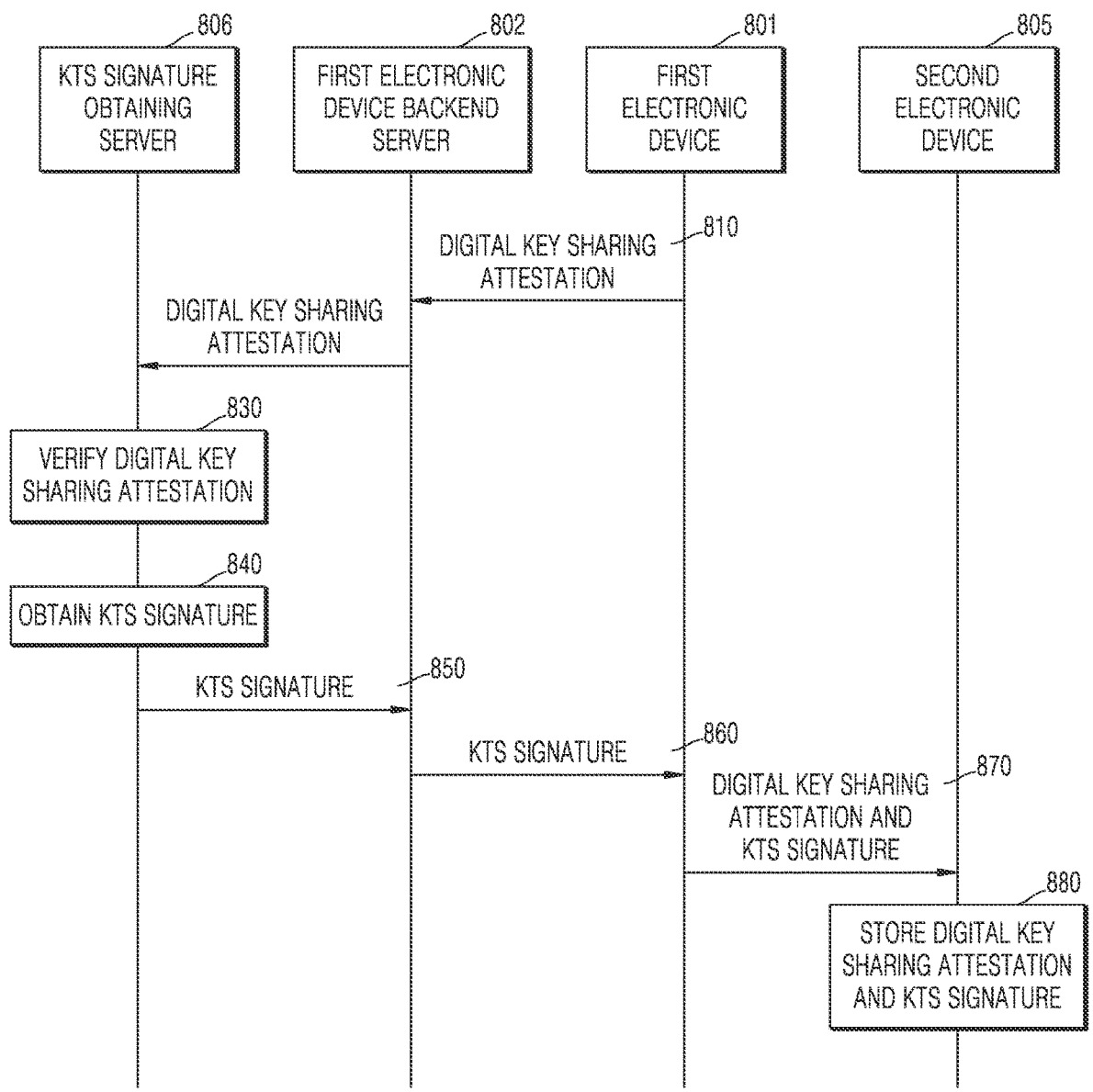
FIG. 8 is a flowchart of a method of receiving, by a second electronic device, a KTS signature to register a shared digital key in a target device, according to an embodiment.

FIG. 8 is a flowchart of a method of receiving, by a second electronic device, a KTS signature to register a shared digital key in a target device, according to an embodiment.

FIG. 8 is a diagram describing a process in which a first electronic device 801, that is, an owner device, obtains a KTS signature and transmits the KTS signature to a second electronic device 805, that is, an electronic device of another user, in an embodiment in which, when an owner device is adjacent to an electronic device of another user and thus is capable of short-range communication such as NFC communication, Bluetooth, or UWB, the owner device transmits a digital key by using the short-range communication, that is, in the embodiment illustrated in FIG. 3.

In operation 810, the first electronic device 801 may transmit a digital key sharing attestation to a first electronic device backend server 802. Here, the digital key sharing attestation may be a digital key sharing attestation created by the first electronic device 801 through the process illustrated in operation 350 of FIG. 3.

Thereafter, in operation 820, the first electronic device backend server 802 may transmit the digital key sharing attestation received from the first electronic device 801, to a KTS signature obtaining server 806. In an embodiment, the KTS signature obtaining server 806 may receive information for verifying the digital key sharing attestation, together with or before receiving the digital key sharing attestation. Also, in an embodiment, the first electronic device 801 may directly transmit the digital key sharing attestation to the KTS signature obtaining server 806 without passing through the first electronic device backend server 802.

In operation 830, the KTS signature obtaining server 806 may verify the received digital key sharing attestation.

Thereafter, in operation 840, the KTS signature obtaining server 806 may obtain a KTS signature corresponding to the digital key sharing attestation. In an embodiment, the KTS signature obtaining server 806 may transmit the verified digital key sharing attestation to a separate backend server creating the KTS signature and may receive the KTS signature from the separate backend server creating the KTS signature. Also, in an embodiment, when the KTS signature obtaining server 806 is a server creating a KTS signature, that is, a KTS backend server, it may create a KTS signature corresponding to the digital key sharing attestation.

In operation 850, the KTS signature obtaining server 806 may transmit the KTS signature to the first electronic device backend server 802.

Thereafter, in operation 860, the first electronic device backend server 802 may transmit the KTS signature to the first electronic device 801.

In operation 870, the first electronic device 801 may transmit the KTS signature together with the digital key sharing attestation to the second electronic device 805.

Thereafter, in operation 880, the second electronic device 805 may store the KTS signature together with the received digital key sharing attestation. The second electronic device 805 may register a digital key in the target device 11 by using the stored digital key sharing attestation and the KTS signature.

In an embodiment, the KTS signature obtaining server 806 may be one of the KTS backend server, the target device backend server 802, and the first electronic device backend server 802. That is, a KTS signature obtaining function may be included in one of the KTS backend server, the target device backend server 802, and the first electronic device backend server 802. In this case, when the target device backend server 802 is the KTS signature obtaining server 806, the first electronic device 801 or the first electronic device backend server 802 may transmit the digital key sharing attestation to the target device backend server 802 and the target device backend server 802 may obtain the KTS signature and transmit the same to the first electronic device 801 or the first electronic device backend server 802. Alternatively, when the first electronic device backend server 802 is the KTS signature obtaining server 806, the first electronic device 801 may transmit the digital key sharing attestation to the first electronic device backend server 802 and the first electronic device backend server 802 may directly obtain the KTS signature and transmit the same to the first electronic device 801.

Figure 9:
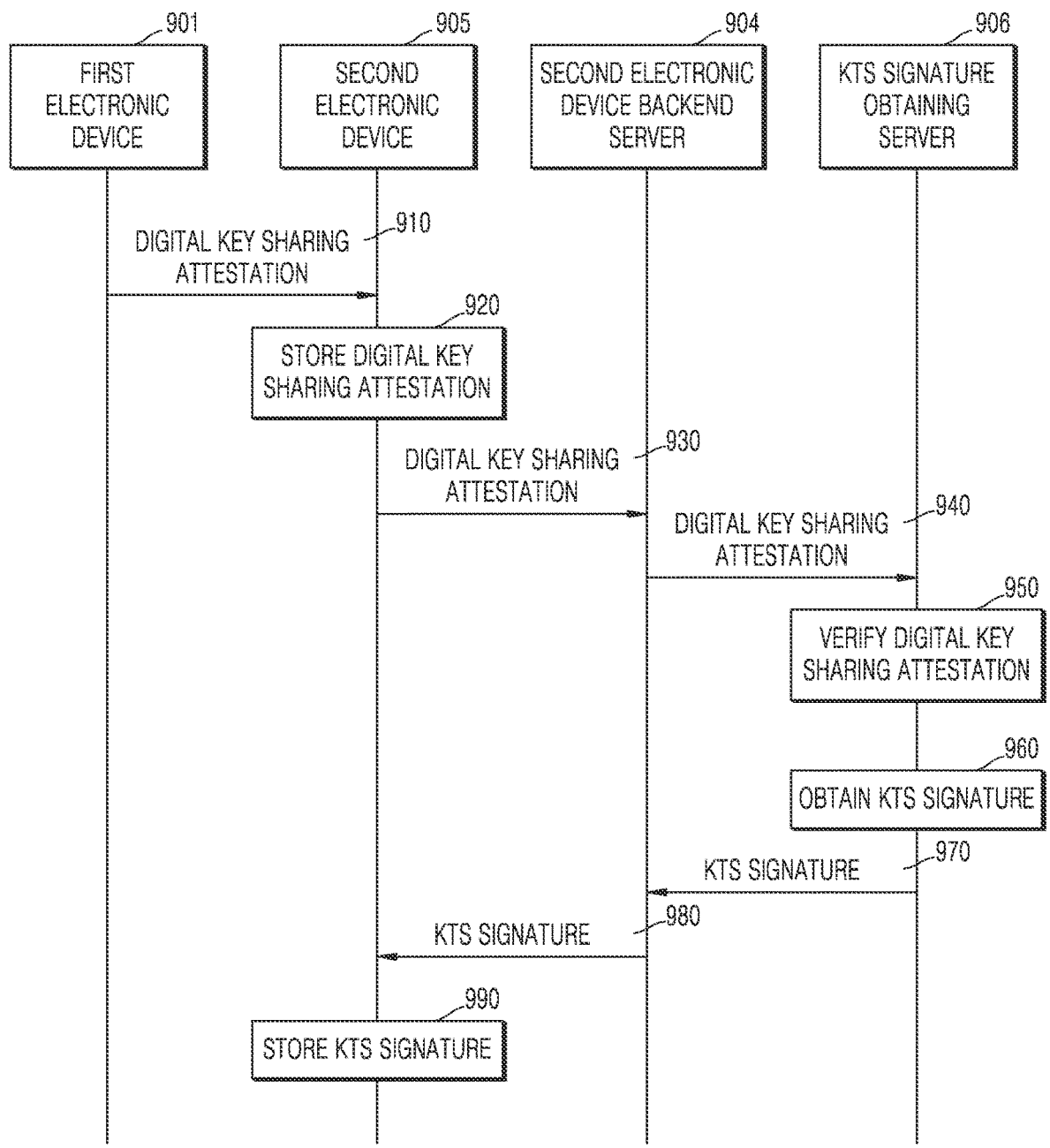
FIG. 9 is a flowchart of a method of receiving, by a second electronic device, a KTS signature to register a shared digital key in a target device, according to another embodiment.

FIG. 9 is a flowchart of a method of receiving, by a second electronic device, a KTS signature to register a shared digital key in a target device, according to another embodiment.

FIG. 9 is a diagram describing a process in which a second electronic device 905, that is, an electronic device of another user, obtains a KTS signature based on a digital key sharing attestation received from a first electronic device 901, that is, an owner device, in an embodiment in which, when an owner device is adjacent to an electronic device of another user and thus is capable of short-range communication such as NFC communication, Bluetooth, or UWB, the owner device transmits a digital key by using the short-range communication, that is, in the embodiment illustrated in FIG. 3.

In operation 910, the first electronic device 901 may transmit a digital key sharing attestation to the second electronic device 905. Here, the digital key sharing attestation may be a digital key sharing attestation created by the first electronic device 901 through the process illustrated in operation 350 of FIG. 3.

Thereafter, in operation 920, the second electronic device 905 may store the received digital key sharing attestation.

In operation 930, the second electronic device 905 may transmit the stored digital key sharing attestation to a second electronic device backend server 904.

Thereafter, in operation 940, the second electronic device backend server 904 may transmit the digital key sharing attestation received from the second electronic device 905, to a KTS signature obtaining server 906. In an embodiment, the KTS signature obtaining server 906 may receive information for verifying the digital key sharing attestation, together with or before receiving the digital key sharing attestation. Also, in an embodiment, the second electronic device 905 may directly transmit the digital key sharing attestation to the KTS signature obtaining server 906 without passing through the second electronic device backend server 904.

In operation 950, the KTS signature obtaining server 906 may verify the received digital key sharing attestation.

Thereafter, in operation 960, the KTS signature obtaining server 906 may obtain a KTS signature corresponding to the digital key sharing attestation. In an embodiment, the KTS signature obtaining server 906 may transmit the verified digital key sharing attestation to a separate backend server creating the KTS signature and may receive the KTS signature from the separate backend server creating the KTS signature. Also, in an embodiment, when the KTS signature obtaining server 906 is a server creating a KTS signature, that is, a KTS backend server, it may create a KTS signature corresponding to the digital key sharing attestation.

In operation 970, the KTS signature obtaining server 906 may transmit the KTS signature to the second electronic device backend server 904.

Thereafter, in operation 980, the second electronic device backend server 904 may transmit the KTS signature to the second electronic device 905.

In operation 990, the second electronic device 905 may store the KTS signature. The second electronic device 905 may register a digital key in the target device 11 by using the stored digital key sharing attestation and the KTS signature.

In an embodiment, the KTS signature obtaining server 906 may be one of the KTS backend server, the target device backend server, and the second electronic device backend server 904. That is, a KTS signature obtaining function may be included in one of the KTS backend server, the target device backend server, and the second electronic device backend server 904. In this case, when the target device backend server is the KTS signature obtaining server 906, the second electronic device 905 or the second electronic device backend server 904 may transmit the digital key sharing attestation to the target device backend server and the target device backend server may obtain the KTS signature and transmit the same to the second electronic device 905 or the second electronic device backend server 904. Alternatively, when the target device backend server is the second electronic device backend server 904, the second electronic device 905 may transmit the digital key sharing attestation to the second electronic device backend server 904 and the second electronic device backend server 904 may directly obtain the KTS signature and transmit the same to the first electronic device 901.

Figure 10:
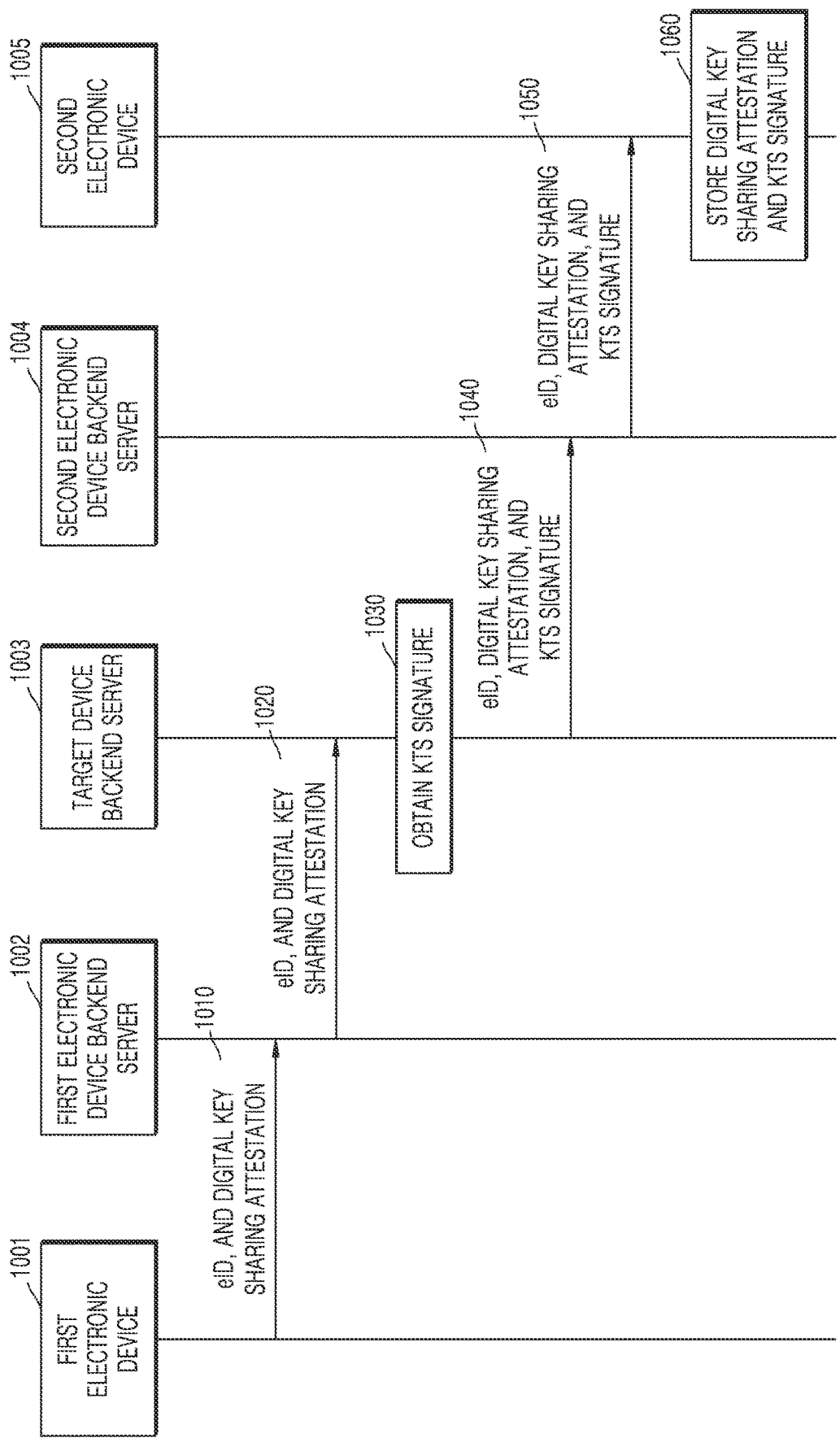
FIG. 10 is a flowchart of a method of receiving, by a second electronic device, a KTS signature to register a shared digital key in a target device, according to another embodiment.

FIG. 10 is a flowchart of a method of receiving, by a second electronic device, a KTS signature to register a shared digital key in a target device, according to another embodiment.

FIG. 10 is a diagram describing a process in which a first electronic device 1001, that is, an owner device, obtains a KTS signature in the process of transmitting a digital key sharing attestation to a second electronic device 1005, that is, an electronic device of another user, and transmits the KTS signature together with the digital key sharing attestation, in an embodiment in which, when an owner device is distant from an electronic device of another user and thus is incapable of short-range communication such as NFC communication, the owner device transmits a digital key through another wired/wireless communication method, that is, in the embodiment illustrated in FIG. 4.

In FIG. 10, operations 1010, 1020, 1040, and 1050 may respectively correspond to operations 476, 480, 484, and 490 of FIG. 4.

In operation 1010, the first electronic device 1001 may transmit the eID and the digital key sharing attestation to a first electronic device backend server 1002. Here, the digital key sharing attestation may be a digital key sharing attestation created by the first electronic device 1001 through the process illustrated in operation 472 of FIG. 4.

Thereafter, in operation 1020, the first electronic device backend server 1002 may transmit the eID and the digital key sharing attestation to a target device backend server 1003.

In operation 1030, the target device backend server 1003 may obtain a KTS signature corresponding to the digital key sharing attestation. In this case, the target device backend server 1003 may verify the received digital key sharing attestation. In an embodiment, the target device backend server 1003 may transmit the digital key sharing attestation or the verified digital key sharing attestation to a separate backend server creating the KTS signature and may receive the KTS signature from the separate backend server creating the KTS signature. Also, in an embodiment, when the target device backend server 1003 is a server creating a KTS signature, it may directly create a KTS signature corresponding to the digital key sharing attestation.

Thereafter, in operation 1040, the target device backend server 1003 may transmit the KTS signature together with the eID and the digital key sharing attestation to a second electronic device backend server 1004.

In operation 1050, the second electronic device backend server 1004 may transmit the KTS signature together with the eID and the digital key sharing attestation to the second electronic device 1005.

Thereafter, in operation 1060, the second electronic device 1005 may store the received digital key sharing attestation and the KTS signature. The second electronic device 1005 may register a digital key in the target device 11 by using the stored digital key sharing attestation and the KTS signature.

Hereinafter, a process in which the second electronic device 405 receives an immobilizer token and registers a digital key by using the KTS signature will be described.

Figure 11:
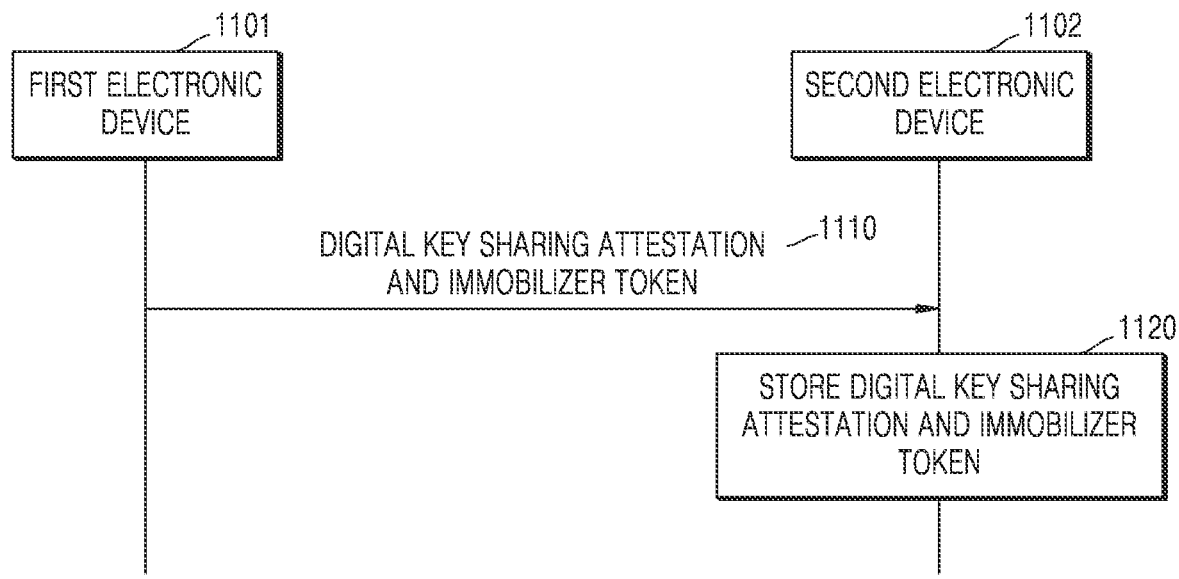
FIG. 11 is a flowchart of a method of receiving, by a second electronic device, an immobilizer token to register a shared digital key in a target device, according to an embodiment.

FIG. 11 is a flowchart of a method of receiving, by a second electronic device, an immobilizer token to register a shared digital key in a target device, according to an embodiment.

FIG. 11 is a diagram describing a process in which a first electronic device 1101, that is, an owner device, directly transmits a stored immobilizer token to a second electronic device 1102, that is, an electronic device of another user, in an embodiment in which, when an owner device is adjacent to an electronic device of another user and thus is capable of short-range communication such as NFC communication, Bluetooth, or UWB, the owner device transmits a digital key by using the short-range communication, that is, in the embodiment illustrated in FIG. 3.

In operation 1110, the first electronic device 1101 may transmit the immobilizer token together with the digital key sharing attestation to the second electronic device 1102. Here, the digital key sharing attestation may be a digital key sharing attestation created by the first electronic device 1101 through the process illustrated in operation 350 of FIG. 3. Also, the immobilizer token may be an immobilizer token that is mapped to the digital key sharing attestation among the immobilizer tokens previously issued or received and stored by the first electronic device 1101. Alternatively, the immobilizer token may be an immobilizer token that is newly issued by the first electronic device 1101 and mapped to the digital key sharing attestation.

In operation 1120, the second electronic device 1102 may store the digital key sharing attestation and the immobilizer token. The second electronic device 1102 may register a digital key in the target device 11 by using the stored digital key sharing attestation and the immobilizer token.

Although FIG. 11 illustrates that the first electronic device 1101 transmits the immobilizer token together with the digital key sharing attestation to the second electronic device 1105, the disclosure is not limited thereto and the first electronic device 1101 may transmit the immobilizer token to the second electronic device 1102 separately from the digital key sharing attestation. More particularly, the immobilizer token receiving process described above may be performed together with or separately from a digital key sharing attestation receiving process and/or a KTS signature receiving process. For example, when an immobilizer token is required, an immobilizer token receiving process may be performed separately. More particularly, in a case where the target device 11 is a vehicle, when an immobilizer token is required to start the engine, an immobilizer token receiving process may be initiated.

Figure 12:
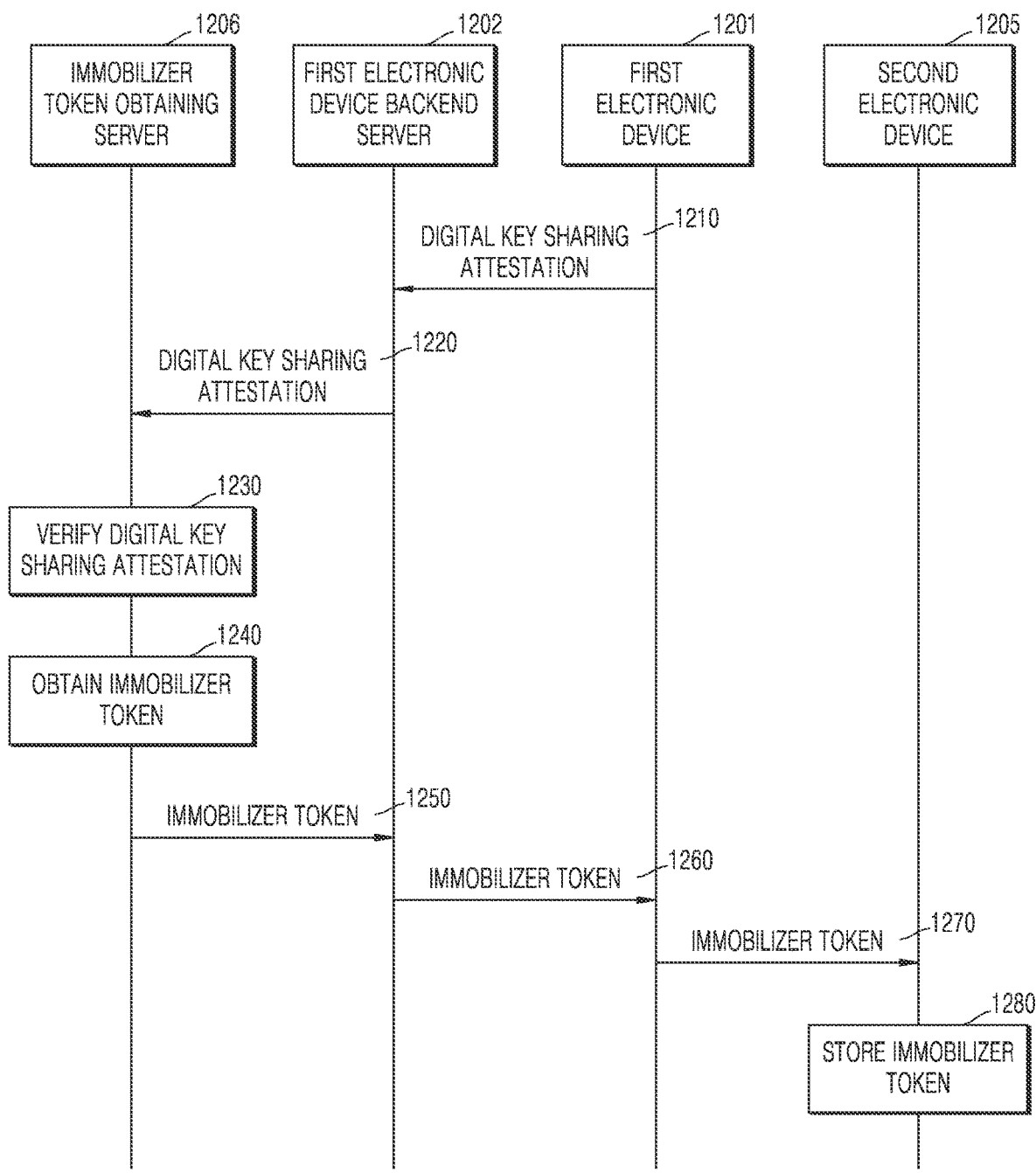
FIG. 12 is a flowchart of a method of receiving, by a second electronic device, an immobilizer token to register a shared digital key in a target device, according to another embodiment.

FIG. 12 is a flowchart of a method of receiving, by a second electronic device, an immobilizer token to register a shared digital key in a target device, according to another embodiment.

FIG. 12 is a diagram describing a process in which a first electronic device 1201, that is, an owner device, obtains an immobilizer token and transmits the immobilizer token to a second electronic device 1205, that is, an electronic device of another user, in an embodiment in which, when an owner device is adjacent to an electronic device of another user and thus is capable of short-range communication such as NFC communication, Bluetooth, or UWB, the owner device transmits a digital key by using the short-range communication, that is, in the embodiment illustrated in FIG. 3.

In operation 1210, the first electronic device 1201 may transmit a digital key sharing attestation to a first electronic device backend server 1202. Here, the digital key sharing attestation may be a digital key sharing attestation created by the first electronic device 1201 through the process illustrated in operation 350 of FIG. 3.

Thereafter, in operation 1220, the first electronic device backend server 1202 may transmit the digital key sharing attestation received from the first electronic device 1201, to an immobilizer token obtaining server 1206. In an embodiment, the immobilizer token obtaining server 1206 may receive information for verifying the digital key sharing attestation, together with or before receiving the digital key sharing attestation. Also, in an embodiment, the first electronic device 1201 may directly transmit the digital key sharing attestation to the immobilizer token obtaining server 1206 without passing through the first electronic device backend server 1202.

In operation 1230, the immobilizer token obtaining server 1206 may verify the received digital key sharing attestation.

Thereafter, in operation 1240, the immobilizer token obtaining server 1206 may obtain an immobilizer token corresponding to the digital key sharing attestation. In an embodiment, the immobilizer token obtaining server 1206 may transmit the verified digital key sharing attestation to a separate backend server creating the immobilizer token and may receive the immobilizer token from the separate backend server creating the immobilizer token. Also, in an embodiment, when the immobilizer token obtaining server 1206 is a server creating an immobilizer token, that is, an immobilizer token issuing server, it may create an immobilizer token corresponding to the digital key sharing attestation.

In operation 1250, the immobilizer token obtaining server 1206 may transmit the immobilizer token to the first electronic device backend server 1202.

Thereafter, in operation 1260, the first electronic device backend server 1202 may transmit the immobilizer token to the first electronic device 1201.

In operation 1270, the first electronic device 1201 may transmit the immobilizer token together with the digital key sharing attestation to the second electronic device 1205.

Thereafter, in operation 1280, the second electronic device 1205 may store the immobilizer token together with the received digital key sharing attestation. The second electronic device 1205 may register a digital key in the target device 11 by using the stored digital key sharing attestation and the immobilizer token.

In an embodiment, the immobilizer token obtaining server 1206 may be one of the immobilizer token issuing server, the target device backend server 1202, and the first electronic device backend server 1202. That is, an immobilizer token obtaining function may be included in one of the immobilizer token issuing server, the target device backend server 1202, and the first electronic device backend server 1202. In this case, when the target device backend server 1202 is the immobilizer token obtaining server 1206, the first electronic device 1201 or the first electronic device backend server 1202 may transmit the digital key sharing attestation to the target device backend server 1202 and the target device backend server 1202 may obtain the immobilizer token and transmit the same to the first electronic device 1201 or the first electronic device backend server 1202. Alternatively, when the first electronic device backend server 1202 is the immobilizer token obtaining server 1206, the first electronic device 1201 may transmit the digital key sharing attestation to the first electronic device backend server 1202 and the first electronic device backend server 1202 may directly obtain the immobilizer token and transmit the same to the first electronic device 1201.

In an embodiment, an immobilizer token receiving process may be performed when an immobilizer token is required. More particularly, in a case where the target device 11 is a vehicle, when an immobilizer token is required to start the engine, an immobilizer token receiving process may be initiated.

Figure 13:
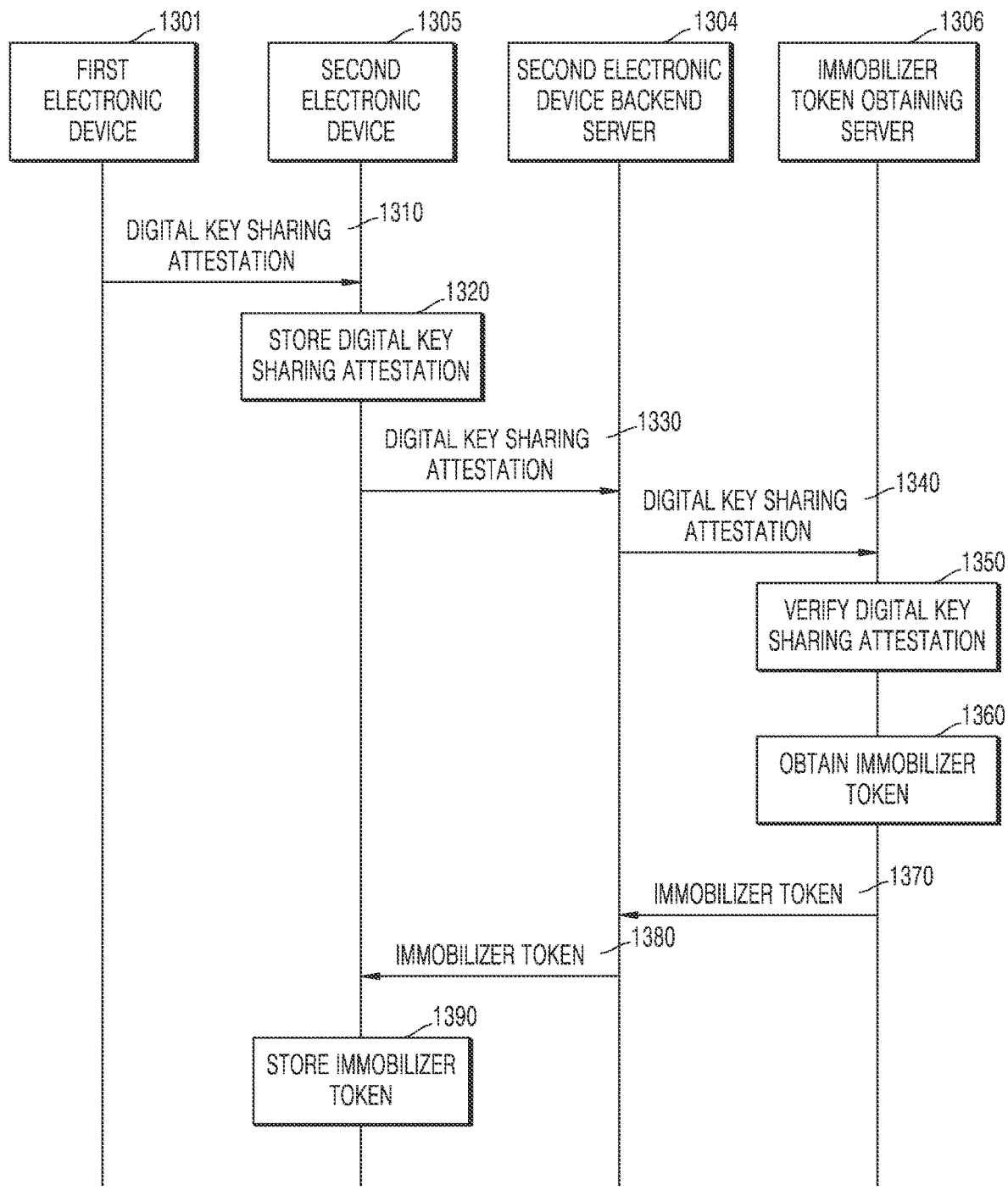
FIG. 13 is a flowchart of a method of receiving, by a second electronic device, an immobilizer token to register a shared digital key in a target device, according to another embodiment.

FIG. 13 is a flowchart of a method of receiving, by a second electronic device, an immobilizer token to register a shared digital key in a target device, according to another embodiment.

FIG. 13 is a diagram describing a process in which a second electronic device 1305, that is, an electronic device of another user, obtains an immobilizer token based on a digital key sharing attestation received from a first electronic device 1301, that is, an owner device, in an embodiment in which, when an owner device is adjacent to an electronic device of another user and thus is capable of short-range communication such as NFC communication, Bluetooth, or UWB, the owner device transmits a digital key by using the short-range communication, that is, in the embodiment illustrated in FIG. 3.

In operation 1310, the first electronic device 1301 may transmit a digital key sharing attestation to the second electronic device 1305. Here, the digital key sharing attestation may be a digital key sharing attestation created by the first electronic device 1301 through the process illustrated in operation 350 of FIG. 3.

Thereafter, in operation 1320, the second electronic device 1305 may store the received digital key sharing attestation.

In operation 1330, the second electronic device 1305 may transmit the stored digital key sharing attestation to a second electronic device backend server 1304.

Thereafter, in operation 1340, the second electronic device backend server 1304 may transmit the digital key sharing attestation received from the second electronic device 1305, to an immobilizer token obtaining server 1306. In an embodiment, the immobilizer token obtaining server 1306 may receive information for verifying the digital key sharing attestation, together with or before receiving the digital key sharing attestation. Also, in an embodiment, the second electronic device 1305 may directly transmit the digital key sharing attestation to the immobilizer token obtaining server 1306 without passing through the second electronic device backend server 1304.

In operation 1350, the immobilizer token obtaining server 1306 may verify the received digital key sharing attestation.

Thereafter, in operation 1360, the immobilizer token obtaining server 1306 may obtain an immobilizer token corresponding to the digital key sharing attestation. In an embodiment, the immobilizer token obtaining server 1306 may transmit the verified digital key sharing attestation to a separate backend server creating the immobilizer token and may receive the immobilizer token from the separate backend server creating the immobilizer token. Also, in an embodiment, when the immobilizer token obtaining server 1306 is a server creating an immobilizer token, that is, an immobilizer token issuing server, it may create an immobilizer token corresponding to the digital key sharing attestation.

In operation 1370, the immobilizer token obtaining server 1306 may transmit the immobilizer token to the second electronic device backend server 1304.

Thereafter, in operation 1380, the second electronic device backend server 1304 may transmit the immobilizer token to the second electronic device 1305.

In operation 1390, the second electronic device 1305 may store the immobilizer token. The second electronic device 1305 may register a digital key in the target device 11 by using the stored digital key sharing attestation and the immobilizer token.

In an embodiment, the immobilizer token obtaining server 1306 may be one of the immobilizer token issuing server, the target device backend server, and the second electronic device backend server 1304. That is, an immobilizer token obtaining function may be included in one of the immobilizer token issuing server, the target device backend server, and the second electronic device backend server 1304. In this case, when the target device backend server is the immobilizer token obtaining server 1306, the second electronic device 1305 or the second electronic device backend server 1304 may transmit the digital key sharing attestation to the target device backend server and the target device backend server may obtain the immobilizer token and transmit the same to the second electronic device 1305 or the second electronic device backend server 1304. Alternatively, when the target device backend server is the second electronic device backend server 1304, the second electronic device 1305 may transmit the digital key sharing attestation to the second electronic device backend server 1304 and the second electronic device backend server 1304 may directly obtain the immobilizer token and transmit the same to the first electronic device 1301.

In an embodiment, an immobilizer token receiving process may be performed when an immobilizer token is required. More particularly, in a case where the target device 11 is a vehicle, when an immobilizer token is required to start the engine, an immobilizer token receiving process may be initiated.

Figure 14:
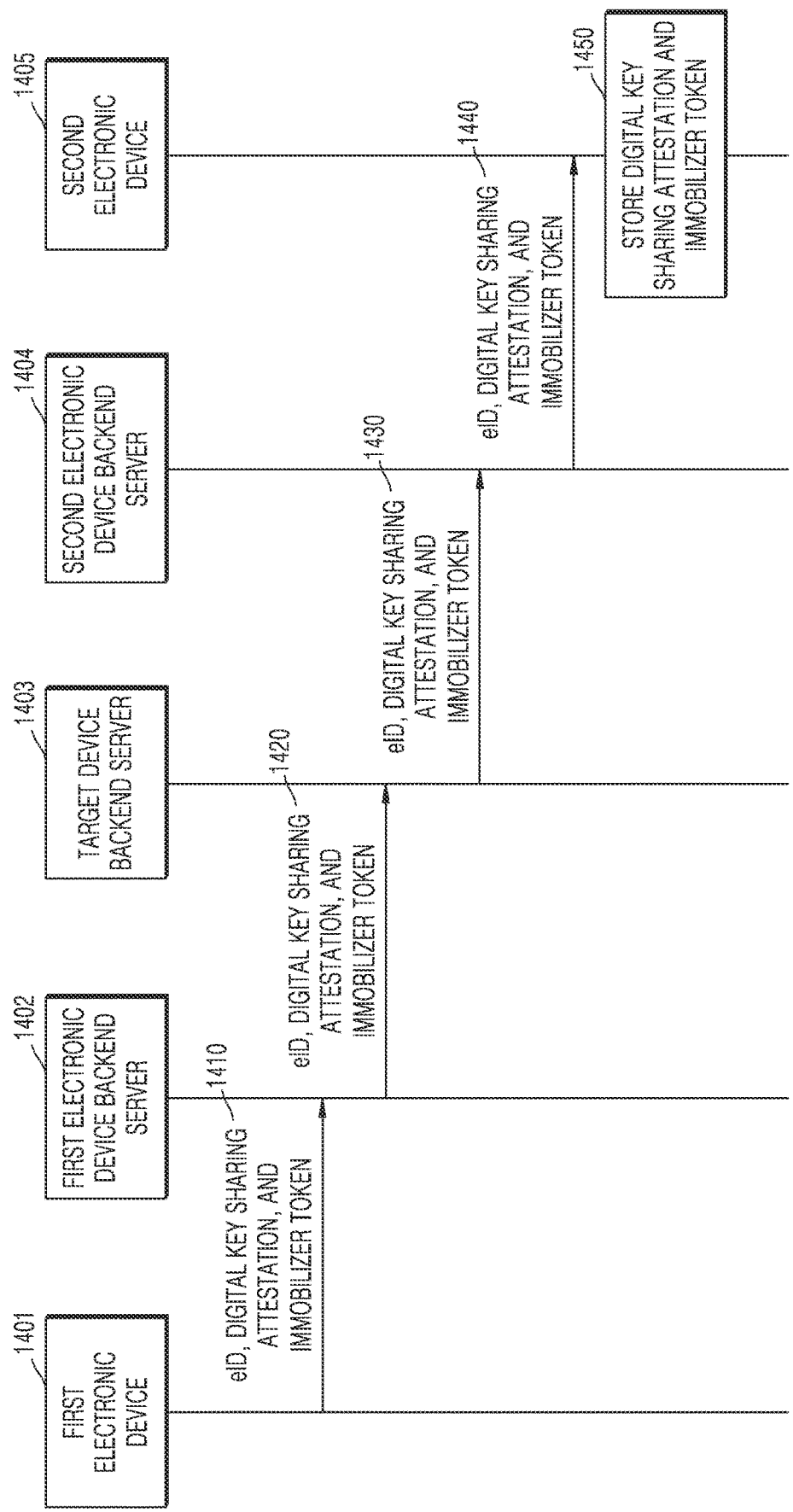
FIG. 14 is a flowchart of a method of receiving, by a second electronic device, an immobilizer token to register a shared digital key in a target device, according to another embodiment.

FIG. 14 is a flowchart of a method of receiving, by a second electronic device, an immobilizer token to register a shared digital key in a target device, according to another embodiment.

FIG. 14 is a diagram describing a process in which a first electronic device 1401, that is, an owner device, transmits a stored immobilizer token to a second electronic device 1405, that is, an electronic device of another user, in an embodiment in which, when an owner device is distant from an electronic device of another user and thus is incapable of short-range communication such as NFC communication, the owner device transmits a digital key through another wired/wireless communication method, that is, in the embodiment illustrated in FIG. 4.

In FIG. 14, operations 1410, 1420, 1430, and 1440 may respectively correspond to operations 476, 480, 484, and 490 of FIG. 4.

In operation 1410, the first electronic device 1401 may transmit the immobilizer token together with the eID and the digital key sharing attestation to a first electronic device backend server 1402. Here, the digital key sharing attestation may be a digital key sharing attestation created by the first electronic device 1401 through the process illustrated in operation 472 of FIG. 4. Also, the immobilizer token may be an immobilizer token that is mapped to the digital key sharing attestation among the immobilizer tokens previously issued or received and stored by the first electronic device 1401. Alternatively, the immobilizer token may be an immobilizer token that is newly issued by the first electronic device 1401 and mapped to the digital key sharing attestation.

Thereafter, in operation 1420, the first electronic device backend server 1402 may transmit the immobilizer token together with the eID and the digital key sharing attestation to a target device backend server 1403.

Thereafter, in operation 1430, the target device backend server 1403 may transmit the immobilizer token together with the eID and the digital key sharing attestation to a second electronic device backend server 1404.

Thereafter, in operation 1440, the second electronic device backend server 1404 may transmit the immobilizer token together with the eID and the digital key sharing attestation to a second electronic device 1405.

Thereafter, in operation 1450, the second electronic device 1405 may store the received digital key sharing attestation and the immobilizer token. The second electronic device 1405 may register a digital key in the target device 11 by using the stored digital key sharing attestation and the immobilizer token.

Although FIG. 14 illustrates that the first electronic device 1401 transmits the immobilizer token together with the digital key sharing attestation to the second electronic device 1405, the disclosure is not limited thereto and the first electronic device 1401 may transmit the immobilizer token to the second electronic device 1405 separately from the digital key sharing attestation. More particularly, the immobilizer token receiving process described above may be performed together with or separately from a digital key sharing attestation receiving process and/or a KTS signature receiving process. For example, when an immobilizer token is required, an immobilizer token receiving process may be performed separately. More particularly, in a case where the target device 11 is a vehicle, when an immobilizer token is required to start the engine, an immobilizer token receiving process may be initiated.

Figure 15:
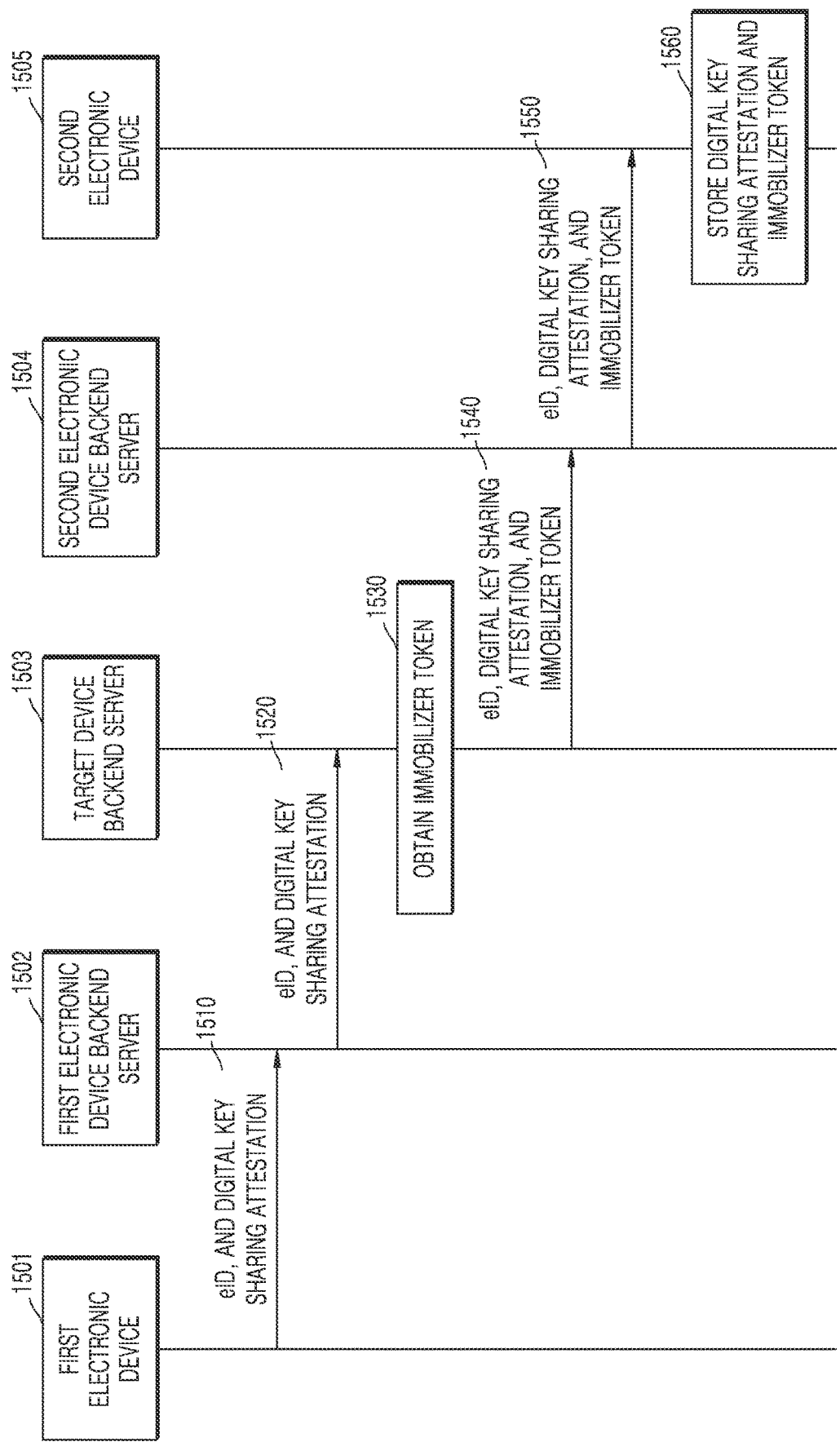
FIG. 15 is a flowchart of a method of receiving, by a second electronic device, an immobilizer token to register a shared digital key in a target device, according to another embodiment.

FIG. 15 is a flowchart of a method of receiving, by a second electronic device, an immobilizer token to register a shared digital key in a target device, according to another embodiment.

FIG. 15 is a diagram describing a process in which a first electronic device 1501, that is, an owner device, obtains an immobilizer token in the process of transmitting a digital key sharing attestation to a second electronic device 1505, that is, an electronic device of another user, and transmits the immobilizer token together with the digital key sharing attestation, in an embodiment in which, when an owner device is distant from an electronic device of another user and thus is incapable of short-range communication such as NFC communication, the owner device transmits a digital key through another wired/wireless communication method, that is, in the embodiment illustrated in FIG. 4.

In FIG. 15, operations 1510, 1520, 1540, and 1550 may respectively correspond to operations 476, 480, 484, and 490 of FIG. 4.

In operation 1510, the first electronic device 1501 may transmit the eID and the digital key sharing attestation to a first electronic device backend server 1502. Here, the digital key sharing attestation may be a digital key sharing attestation created by the first electronic device 1501 through the process illustrated in operation 472 of FIG. 4.

Thereafter, in operation 1520, the first electronic device backend server 1502 may transmit the eID and the digital key sharing attestation to a target device backend server 1503.

In operation 1530, the target device backend server 1503 may obtain an immobilizer token corresponding to the digital key sharing attestation. In this case, the target device backend server 1503 may verify the received digital key sharing attestation. In an embodiment, the target device backend server 1503 may transmit the digital key sharing attestation or the verified digital key sharing attestation to a separate backend server creating the immobilizer token and may receive the immobilizer token from the separate backend server creating the immobilizer token. Also, in an embodiment, when the target device backend server 1503 is a server creating an immobilizer token, that is, an immobilizer token generating server, it may directly create an immobilizer token corresponding to the digital key sharing attestation.

Thereafter, in operation 1540, the target device backend server 1503 may transmit the immobilizer token together with the eID and the digital key sharing attestation to a second electronic device backend server 1504.

Thereafter, in operation 1550, the second electronic device backend server 1504 may transmit the immobilizer token together with the eID and the digital key sharing attestation to the second electronic device 1505.

Thereafter, in operation 1560, the second electronic device 1505 may store the received digital key sharing attestation and the immobilizer token. The second electronic device 1505 may register a digital key in the target device 11 by using the stored digital key sharing attestation and the immobilizer token.

In an embodiment, an immobilizer token receiving process may be performed when an immobilizer token is required. More particularly, in a case where the target device 11 is a vehicle, when an immobilizer token is required to start the engine, an immobilizer token receiving process may be initiated.

Figure 16:
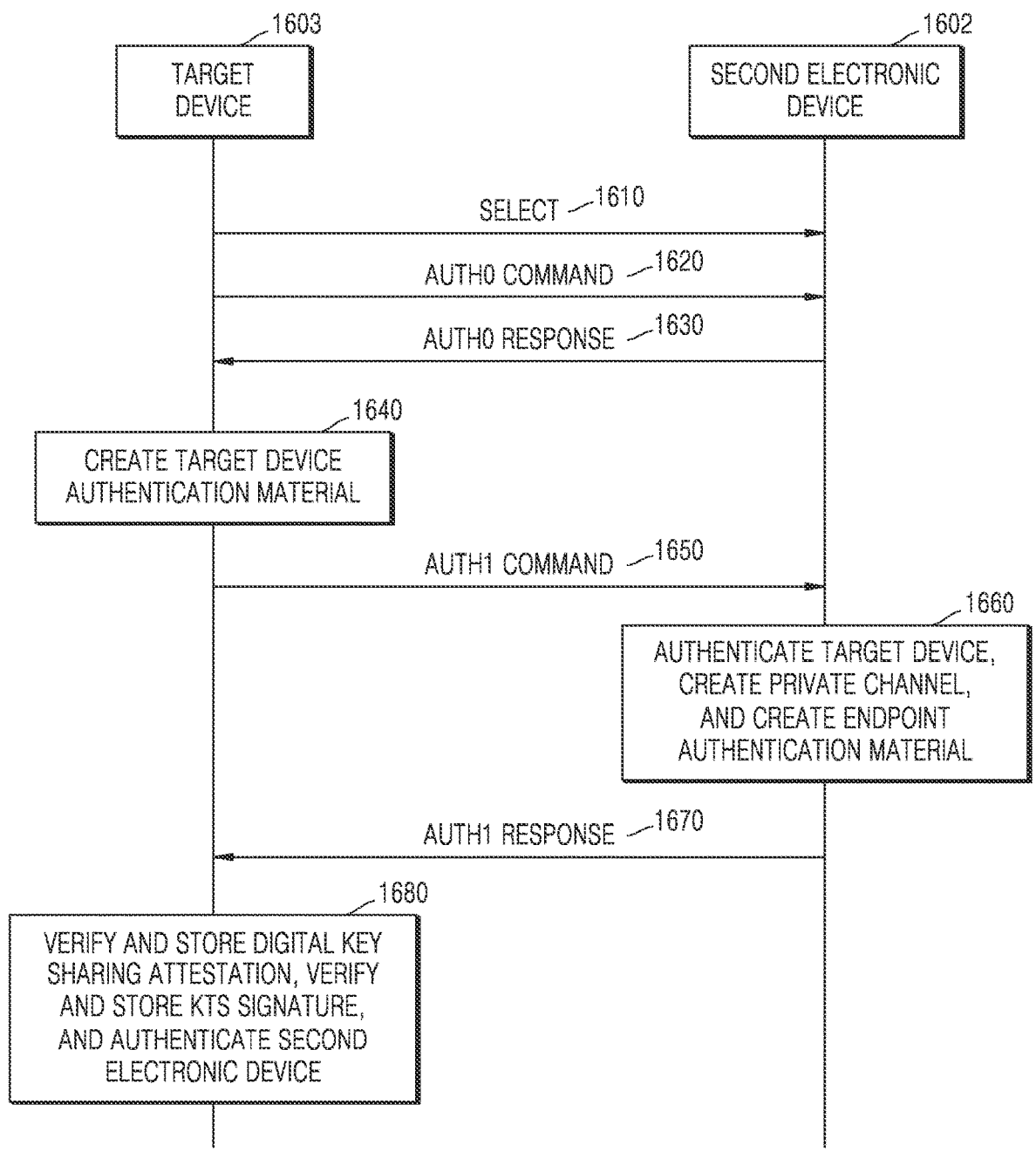
FIG. 16 is a flowchart of a method of registering, by a second electronic device, a shared digital key in a target device, according to an embodiment.

FIG. 16 is a flowchart of a method of registering, by a second electronic device, a shared digital key in a target device, according to an embodiment.

In operation 1610, a target device 1603 may select a second electronic device 1602 storing a shared digital key to be registered. In an embodiment, by locating an NFC reader included in the target device 1603 and an NFC reader included in the second electronic device 1602 in contact with or close to each other, the target device 1603 may select the second electronic device 1602.

Thereafter, in operation 1620, the target device 1603 may transmit a first authentication command (AUTH0 command) to the second electronic device 1602. In an embodiment, the first authentication command (AUTH0 command) may include a target device temporary public key (vehicle.ePK) and a target device identifier (vehicle identifier).

In operation 1630, the second electronic device 1602 may transmit a first authentication response (AUTH0 response) to the target device 1603 in response to the first authentication command (AUTH0 command). In an embodiment, the first authentication response (AUTH0 response) may include a second electronic device temporary public key (endpoint.ePK).

Thereafter, in operation 1640, the target device 1603 may create a target device authentication material (vehicle authentication material). In an embodiment, the target device authentication material (vehicle authentication material) may be the signature of the target device 1603 (signature of the vehicle) to the second electronic device temporary public key (endpoint.ePK) received in operation 1630.

In operation 1650, the target device 1603 may transmit a second authentication command (AUTH1 command) to the second electronic device 1602. In an embodiment, the second authentication command (AUTH1 command) may include a target device authentication material (vehicle authentication material).

In operation 1660, the second electronic device 1602 may perform target device (vehicle) authentication, create an encrypted channel (private channel), and create a second electronic device authentication material (endpoint authentication material). In an embodiment, the second electronic device 1602 may perform target device (vehicle) authentication by using the stored digital key sharing attestation. Also, the second electronic device 1602 may create an encrypted channel (private channel) by creating an exchanged temporary key. Also, the second electronic device 1602 may be the signature of the second electronic device 1602 (signature of the endpoint) to the target device temporary public key (vehicle.ePK).

In operation 1670, the second electronic device 1602 may transmit a second authentication response (AUTH1 response) to the target device 1603 in response to the second authentication command (AUTH1 command). In an embodiment, the second authentication response (AUTH1 response) may include a second electronic device identifier (endpoint identifier), a second electronic device authentication material (endpoint authentication material), a digital key sharing attestation, and a KTS signature. All the information included in the second authentication response (AUTH1 response) may be encrypted with a session key.

In operation 1680, the target device 1603 may verify the digital key sharing attestation, verify the KTS signature, store the digital key sharing attestation and the KTS signature, and perform authentication on a second device (authenticate device). In an embodiment, the target device 1603 may create a session key by using the exchanged temporary key and decrypt the encrypted information by using the created session key. Also, the target device 1603 may verify the digital key sharing attestation by using the owner information prestored in the target device 1603 and may verify the validity of the KTS signature. Also, the target device 1603 may verify the second electronic device authentication material (endpoint authentication material) by using the digital key of the second electronic device.

In an embodiment, a registration process using the immobilizer token may be performed in the process of registering the shared digital key in the target device by the second electronic device described above or may be performed separately. For example, when an immobilizer token is required, a registration process using the immobilizer token may be performed separately. More particularly, in a case where the target device 11 is a vehicle, when an immobilizer token is required to start the engine, the second electronic device 240 may perform a registration process using the immobilizer token.

Figure 17:
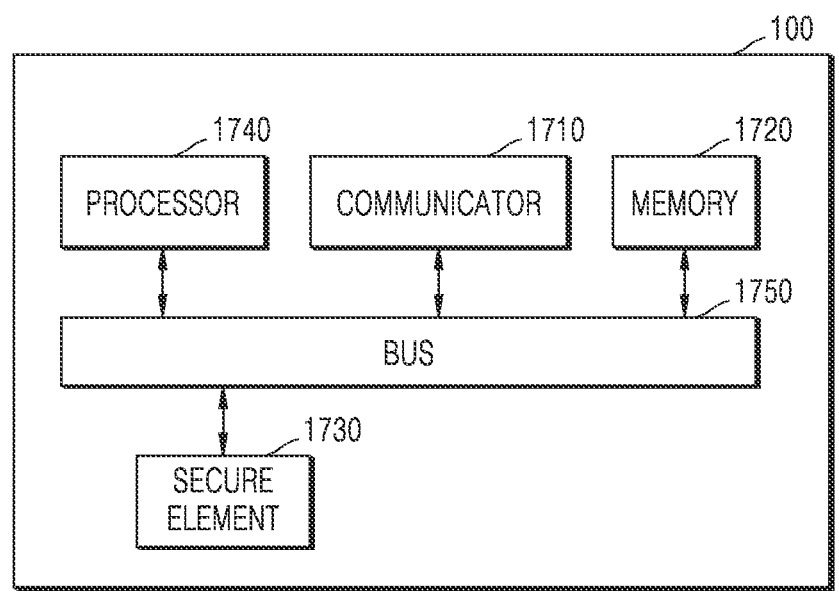
FIG. 17 is a block diagram illustrating an internal configuration of a first electronic device according to an embodiment.

FIG. 17 is a block diagram illustrating an internal configuration of a first electronic device according to an embodiment.

Referring to FIG. 17, a first electronic device 100, that is, an owner device, may include a communicator 1710, a memory 1720, a secure element 1730, a processor 1740, and a bus 1750 connecting the respective components to each other. However, the disclosure is not limited thereto and the first electronic device 100 may be implemented by more or fewer components than all the components illustrated in FIG. 17.

Although FIG. 17 illustrates that the first electronic device 100 includes one processor, embodiments are not limited thereto and the first electronic device 100 may include a plurality of processors. At least some of the operations and functions of the processor 1740 described below may be performed by a plurality of processors. The first electronic device 100 illustrated in FIG. 17 may perform a method of registering a shared key by processing a KTS signature and an immobilizer token according to various embodiments of the disclosure, and the description with reference to FIGS. 3 to 16 may be applied thereto. Thus, redundant descriptions thereof will be omitted for conciseness.

The communicator 1710 may perform wired/wireless communication with another device, a server, or a network. For this purpose, the communicator 1710 may include a communication module that supports at least one of various wired/wireless communication methods. For example, the communication module may be in the form of a chipset or may be a sticker/barcode including information necessary for communication (e.g., a sticker including an NFC tag).

The wireless communication may include, for example, at least one of cellular communication, Wireless Fidelity (Wi-Fi), Wi-Fi Direct, Bluetooth, Ultra Wide Band (UWB), or Near Field Communication (NFC). The wired communication may include, for example, at least one of USB or High Definition Multimedia Interface (HDMI).

In an embodiment, the communicator 1710 may include a communication module for short-range communication. For example, the communicator 1710 may include a communication module for performing various short-range communications such as infrared communication, Magnetic Secure Transmission (MST), and magnetic security communication in addition to Wi-Fi, Wi-Fi Direct, Bluetooth, NFC, and UWB described above.

The memory 1720 may install and store therein various types of data such as files or programs such as applications. The processor 1740 may access and use the data stored in the memory 1720 or may store new data in the memory 1720.

In an embodiment, a program and data for registering a shared digital key in a target device may be installed and stored in the memory 1720. However, embodiments of the disclosure are not limited thereto, and a program and data for registering a shared digital key to a target device may be installed and stored in the secure element 1730.

The secure element 1730 may be a security storage device of the first electronic device 100 and may be a security area accessible only by an authenticated application. The secure element 1730 may be separated from a general storage area in software or may be physically separated from the memory 1720.

The processor 1740 may control an overall operation of the first electronic device 100 and may include at least one processor such as a CPU or a GPU. The processor 1740 may control other components included in the first electronic device 100 to perform an operation for sharing a digital key. The processor 1740 may control other components included in the first electronic device 100 to perform an operation for registering a shared digital key in a target device.

The processor 1740 may execute the program stored in the memory 1720 and the secure element 1730, may read the stored file, or may store a new file.

The bus 1750 may be a common data transmission path for connecting the communicator 1710, the memory 1720, the secure element 1730, and the processor 1740 to each other.

Figure 18:
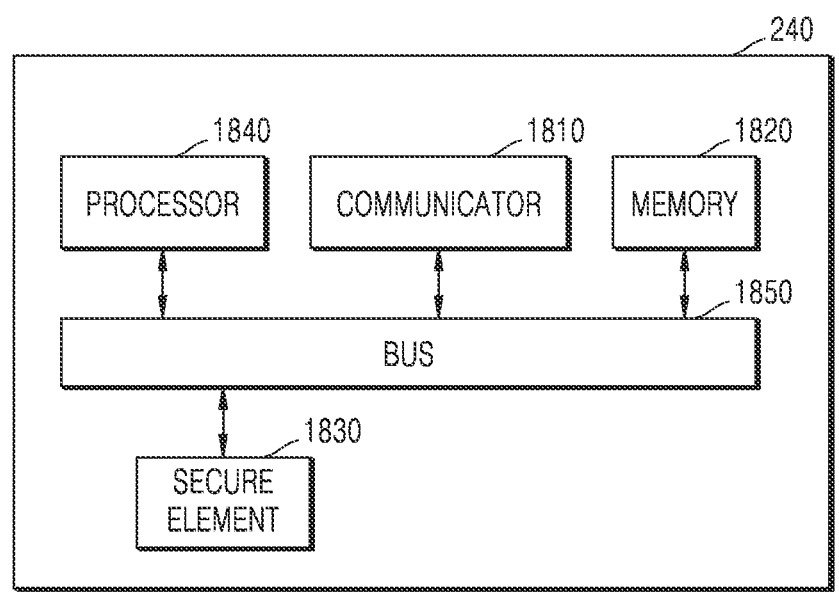
FIG. 18 is a block diagram illustrating an internal configuration of a second electronic device according to an embodiment.

FIG. 18 is a block diagram illustrating an internal configuration of a second electronic device according to an embodiment.

Referring to FIG. 18, a second electronic device 240, that is, an electronic device of another user, may include a communicator 1810, a memory 1820, a secure element 1830, a processor 1840, and a bus 1850 connecting the respective components to each other. However, the disclosure is not limited thereto and the second electronic device 240 may be implemented by more or fewer components than all the components illustrated in FIG. 18.

Although FIG. 18 illustrates that the second electronic device 240 includes one processor, embodiments are not limited thereto and the second electronic device 240 may include a plurality of processors. At least some of the operations and functions of the processor 1840 described below may be performed by a plurality of processors. The second electronic device 240 illustrated in FIG. 18 may perform a method of registering a shared key by processing a KTS signature and an immobilizer token according to various embodiments of the disclosure, and the description with reference to FIGS. 3 to 16 may be applied thereto. Thus, redundant descriptions thereof will be omitted for conciseness.

The communicator 1810 may perform wired/wireless communication with another device, a server, or a network. For this purpose, the communicator 1810 may include a communication module that supports at least one of various wired/wireless communication methods. For example, the communication module may be in the form of a chipset or may be a sticker/barcode including information necessary for communication (e.g., a sticker including an NFC tag).

The wireless communication may include, for example, at least one of cellular communication, Wireless Fidelity (Wi-Fi), Wi-Fi Direct, Bluetooth, Ultra Wide Band (UWB), or Near Field Communication (NFC). The wired communication may include, for example, at least one of USB or High Definition Multimedia Interface (HDMI).

In an embodiment, the communicator 1810 may include a communication module for short-range communication. For example, the communicator 1810 may include a communication module for performing various short-range communications such as infrared communication, Magnetic Secure Transmission (MST), and magnetic security communication in addition to Wi-Fi, Wi-Fi Direct, Bluetooth, NFC, and UWB described above.

The memory 1820 may install and store therein various types of data such as files or programs such as applications. The processor 1840 may access and use the data stored in the memory 1820 or may store new data in the memory 1820. In an embodiment, a program and data for registering a shared digital key in a target device may be installed and stored in the memory 1820. However, embodiments of the disclosure are not limited thereto, and a program and data for registering a shared digital key to a target device may be installed and stored in the secure element 1830.

The secure element 1830 may be a security storage device of the second electronic device 240 and may be a security area accessible only by an authenticated application. The secure element 1830 may be separated from a general storage area in software or may be physically separated from the memory 1820.

The processor 1840 may control an overall operation of the second electronic device 240 and may include at least one processor such as a CPU or a GPU. The processor 1840 may control other components included in the second electronic device 240 to perform an operation for sharing a digital key. The processor 1840 may control other components included in the second electronic device 240 to perform an operation for registering a shared digital key in a target device.

The processor 1840 may execute the program stored in the memory 1820 and the secure element 1830, may read the stored file, or may store a new file.

According to an embodiment, the processor 1840 may control the respective components to receive a digital key sharing attestation and a KTS signature corresponding to the digital key sharing attestation, receive an authentication request from a target device, and transmit an authentication response including the digital key sharing attestation and the KTS signature to the target device in response to the authentication request.

The bus 1850 may be a common data transmission path for connecting the communicator 1810, the memory 1820, the secure element 1830, and the processor 1840 to each other.

Figure 19:
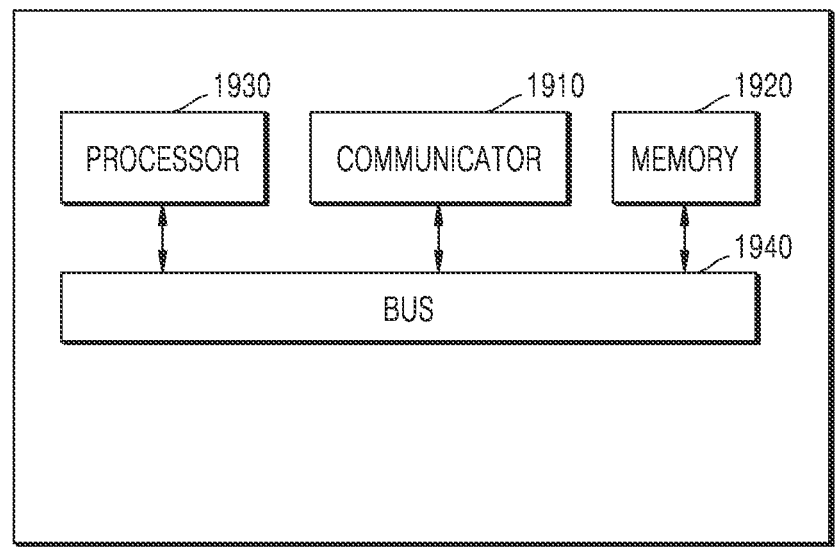
FIG. 19 is a block diagram illustrating an internal configuration of a KTS signature obtaining server according to an embodiment.

FIG. 19 is a block diagram illustrating an internal configuration of a KTS signature obtaining server according to an embodiment.

Referring to FIG. 19, the KTS signature obtaining server may include a communicator 1910, a memory 1920, a processor 1930, and a bus 1940 connecting the respective components to each other. However, the disclosure is not limited thereto and the KTS signature obtaining server may be implemented by more or fewer components than all the components illustrated in FIG. 19.

Although FIG. 19 illustrates that the KTS signature obtaining server includes one processor, embodiments are not limited thereto and the KTS signature obtaining server may include a plurality of processors. At least some of the operations and functions of the processor 1930 described below may be performed by a plurality of processors. The KTS signature obtaining server illustrated in FIG. 19 may perform a method of obtaining a KTS signature according to various embodiments of the disclosure, and the description of FIGS. 3 to 16 may be applied thereto. Thus, redundant descriptions thereof will be omitted for conciseness.

The communicator 1910 may perform wired/wireless communication with another device, a server, or a network. For this purpose, the communicator 1910 may include a communication module that supports at least one of various wired/wireless communication methods. For example, the communication module may be in the form of a chipset or may be a sticker/barcode including information necessary for communication (e.g., a sticker including an NFC tag).

The wireless communication may include, for example, at least one of cellular communication, Wireless Fidelity (Wi-Fi), Wi-Fi Direct, Bluetooth, Ultra Wide Band (UWB), or Near Field Communication (NFC). The wired communication may include, for example, at least one of USB or High Definition Multimedia Interface (HDMI).

The memory 1920 may install and store therein various types of data such as files or programs such as applications. The processor 1930 may access and use the data stored in the memory 1920 or may store new data in the memory 1920. In an embodiment, a program and data for obtaining a KTS signature may be installed and stored in the memory 1920.

The processor 1930 may control an overall operation of the KTS signature obtaining server and may include at least one processor such as a CPU or a GPU. The processor 1930 may control other components included in the owner device 100 to perform an operation for obtaining a KTS signature. The processor 1930 may control other components included in the KTS signature obtaining server to perform an operation for registering a shared digital key in a target device.

The processor 1930 may execute the program stored in the memory 1920, may read the stored file, or may store a new file.

According to an embodiment, the processor 1930 may control the respective components to receive a digital key sharing attestation from a first device, verify the digital key sharing attestation, obtain a KTS signature corresponding to the digital key sharing attestation, and transmit the KTS signature to a second device.

The bus 1940 may be a common data transmission path for connecting the communicator 1910, the memory 1920, and the processor 1930 to each other.

Figure 20:
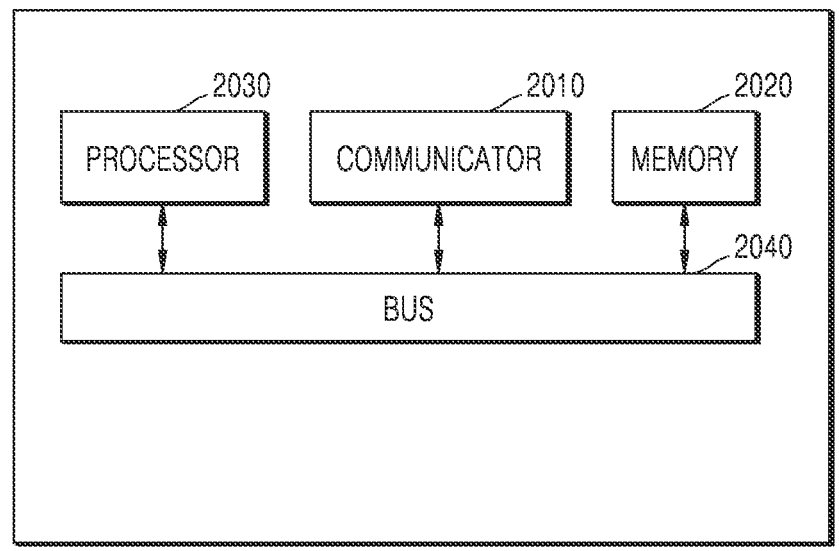
FIG. 20 is a block diagram illustrating an internal configuration of an immobilizer token obtaining server according to an embodiment.

FIG. 20 is a block diagram illustrating an internal configuration of an immobilizer token obtaining server according to an embodiment.

Referring to FIG. 20, the immobilizer token obtaining server may include a communicator 2010, a memory 2020, a processor 2030, and a bus 2040 connecting the respective components to each other. However, the disclosure is not limited thereto and the immobilizer token obtaining server may be implemented by more or fewer components than all the components illustrated in FIG. 20.

Although FIG. 20 illustrates that the immobilizer token obtaining server includes one processor, embodiments are not limited thereto and the immobilizer token obtaining server may include a plurality of processors. At least some of the operations and functions of the processor 2030 described below may be performed by a plurality of processors. The immobilizer token obtaining server illustrated in FIG. 20 may perform a method of obtaining an immobilizer token (i.e., Key Tracking Server signature) according to various embodiments of the disclosure, and the description of FIGS. 3 to 16 may be applied thereto. Thus, redundant descriptions thereof will be omitted for conciseness.

The communicator 2010 may perform wired/wireless communication with another device, a server, or a network. For this purpose, the communicator 2010 may include a communication module that supports at least one of various wired/wireless communication methods. For example, the communication module may be in the form of a chipset or may be a sticker/barcode including information necessary for communication (e.g., a sticker including an NFC tag).

The wireless communication may include, for example, at least one of cellular communication, Wireless Fidelity (Wi-Fi), Wi-Fi Direct, Bluetooth, Ultra Wide Band (UWB), or Near Field Communication (NFC). The wired communication may include, for example, at least one of USB or High Definition Multimedia Interface (HDMI).

The memory 2020 may install and store therein various types of data such as files or programs such as applications. The processor 2030 may access and use the data stored in the memory 2020 or may store new data in the memory 2020. In an embodiment, a program and data for obtaining an immobilizer token may be installed and stored in the memory 2020.

The processor 2030 may control an overall operation of the immobilizer token obtaining server and may include at least one processor such as a CPU or a GPU. The processor 2030 may control other components included in the owner device 100 to perform an operation for obtaining an immobilizer token. The processor 2030 may control other components included in the immobilizer token obtaining server to perform an operation for registering a shared digital key in a target device.

The processor 2030 may execute the program stored in the memory 2020, may read the stored file, or may store a new file.

According to an embodiment, the processor 2030 may control the respective components to receive a digital key sharing attestation from a first device, verify the digital key sharing attestation, obtain an immobilizer token corresponding to the digital key sharing attestation, and transmit the immobilizer token to a second device.

The bus 2040 may be a common data transmission path for connecting the communicator 2010, the memory 2020, and the processor 2030 to each other.

Meanwhile, the above embodiments may be written as programs executable by computers and may be implemented in general-purpose digital computers that execute the programs by using computer-readable recording mediums. Also, the data structure used in the above embodiments may be written on computer-readable recording mediums through various means. Also, the above embodiments may be implemented in the form of computer program products including recording mediums including instructions executable by computers, such as program modules executed by computers. For example, the methods implemented by software modules or algorithms may be stored on computer-readable recording mediums as computer-readable and computer-executable codes or program instructions.

The computer-readable recording mediums may be any recording mediums accessible by computers and may include volatile or non-volatile mediums and removable or non-removable mediums. The computer-readable recording mediums may include, but are not limited to, storage mediums such as magnetic storage mediums such as ROMs, floppy disks, or hard disks and optical storage mediums such as CD-ROMs or DVDs. Also, the computer-readable recording mediums may include computer storage mediums and communication mediums.

Also, a plurality of computer-readable recording mediums may be distributed in networked computer systems, and data stored in the distributed recording mediums, for example, program instructions and code, may be executed by at least one computer.

Although embodiments of the disclosure have been described above with reference to the accompanying drawings, those of ordinary skill in the art to which the disclosure pertains will understand that the disclosure may be implemented in other particular forms without departing from the technical spirit or features of the disclosure. Therefore, it is to be understood that the embodiments described above should be considered in a descriptive sense only and not for purposes of limitation.

The invention claimed is:

1. An operating method of a second electronic device, the method comprising:
   receiving a digital key sharing attestation from a first electronic device, wherein the digital key sharing attestation is created by the first electronic device based on a digital key certificate received from the second electronic device and includes a signature of the first electronic device;
   transmitting the digital key sharing attestation to a server; and
   receiving an immobilizer token corresponding to the digital key sharing attestation from the server.

2. The method of claim 1, wherein the server includes a server operated by a manufacturer of a target device.

3. The method of claim 1, wherein the receiving of the immobilizer token comprises receiving the immobilizer token from the server through a second electronic device backend server.

4. A second electronic device comprising:
   a communicator;
   at least one memory storing an operating program of the second electronic device; and
   at least one processor configured to execute the operating program to control the communicator to:
      receive a digital key sharing attestation from a first electronic device, wherein the digital key sharing attestation is created by the first electronic device based on a digital key certificate received from the second electronic device and includes a signature of the first electronic device,
      transmit the digital key sharing attestation to a server, and
      receive an immobilizer token corresponding to the digital key sharing attestation from the server.

* * * * *